United States Patent
Pan et al.

(10) Patent No.: US 11,357,064 B2
(45) Date of Patent: Jun. 7, 2022

(54) METHOD AND APPARATUS FOR SUPPORTING ONE-TO-ONE SIDELINK COMMUNICATION IN A WIRELESS COMMUNICATION SYSTEM

(71) Applicant: ASUSTek Computer Inc., Taipei (TW)

(72) Inventors: Li-Te Pan, Taipei (TW); Richard Lee-Chee Kuo, Taipei (TW); Li-Chih Tseng, Taipei (TW)

(73) Assignee: ASUSTek Computer Inc., Taipei (TW)

(*) Notice: Subject to any disclaimer, the term of this patent is extended or adjusted under 35 U.S.C. 154(b) by 0 days.

(21) Appl. No.: 16/703,265

(22) Filed: Dec. 4, 2019

(65) Prior Publication Data

US 2020/0205209 A1    Jun. 25, 2020

Related U.S. Application Data

(60) Provisional application No. 62/784,631, filed on Dec. 24, 2018.

(51) Int. Cl.

| | |
|---|---|
| *H04W 4/06* | (2009.01) |
| *H04W 76/14* | (2018.01) |
| *H04W 4/40* | (2018.01) |
| *H04W 72/00* | (2009.01) |
| *H04W 72/04* | (2009.01) |
| *H04W 72/08* | (2009.01) |

(52) U.S. Cl.
CPC .............. *H04W 76/14* (2018.02); *H04W 4/40* (2018.02); *H04W 72/005* (2013.01); *H04W 72/048* (2013.01); *H04W 72/085* (2013.01)

(58) Field of Classification Search
None
See application file for complete search history.

(56) References Cited

U.S. PATENT DOCUMENTS

| | | | | |
|---|---|---|---|---|
| 10,856,118 | B2* | 12/2020 | Lee | ........................ H04W 84/18 |
| 10,924,912 | B2* | 2/2021 | Kim | ........................ H04W 48/08 |
| 2017/0150490 | A1* | 5/2017 | Chen | ........................ H04W 92/10 |

(Continued)

FOREIGN PATENT DOCUMENTS

| | | |
|---|---|---|
| WO | 2017099833 | 6/2017 |
| WO | 2017180258 | 10/2017 |
| WO | 2019081027 | 5/2019 |

OTHER PUBLICATIONS

"3rd Generation Partnership Project; Technical Specification Group Services and System Aspects; Study on architecture enhancements for EPS and 5G System to support advanced V2X services (Release 16)", 3GPP Draft; 23786-100, 3rd Generation Partnership Project (3GPP), Mobile Competence Centre ; 650, Route Des Lucioles ; F-06921 Sophia-Antipolis Cedex ;France Dec. 5, 2018 (Dec. 5, 2018), XP051498398.

(Continued)

*Primary Examiner* — Willie J Daniel, Jr.
(74) *Attorney, Agent, or Firm* — Cooper Legal Group LLC

(57) ABSTRACT

A method and apparatus are disclosed from the perspective of an initiating UE (User Equipment) for establishing a one-to-one sidelink communication with a target UE. In one embodiment, the method includes transmitting a first PC5 signalling used for establishing the one-to-one sidelink communication, wherein the first PC5 signalling includes an identity of the target UE and an identity of a V2X (Vehicle-to-Everything) service.

20 Claims, 23 Drawing Sheets

(56) References Cited

U.S. PATENT DOCUMENTS

| | | | |
|---|---|---|---|
| 2019/0104450 A1 | 4/2019 | Adachi | |
| 2019/0124015 A1* | 4/2019 | Loehr | H04L 67/322 |
| 2019/0215685 A1* | 7/2019 | Wang | H04W 4/40 |
| 2019/0364402 A1* | 11/2019 | Lee | H04W 84/005 |
| 2020/0084592 A1* | 3/2020 | Gulati | H04W 4/40 |

OTHER PUBLICATIONS

European Search Report in corresponding EP Application No. 19213539.0, dated Feb. 5, 2020.
"3rd Generation Partnership Project; Technical Specification Group Core Network and Terminals; Proximity-services (ProSe) User Equipment (UE) to ProSe function protocol aspects; Stage 3 (Release 15)", 3GPP Standard; Technical Specification; 3GPP TS 24.334, 3rd Generation Partnership Project (3GPP), Mobile Competence Centre; 650, Route Des Lucioles; F-06921 Sophia-Antipolis Cedex; France; vol. CT WG1, No. V15.2.0, Sep. 20, 2018, pp. 1-264, XP051487060.
3rd Generation Partnership Project, "Technical Specification Group Services and System Aspects; Proximity-based services (ProSe)", 3GPP TS 23.303, V15.1.0, Jun. 2018, Stage 2 (Release 15), pp. 1-130.
Corresponding Korean Patent Application No. 10-2019-0160166, Office Action dated Jan. 26, 2021. English Translation.
3rd Generation Partnership Project, Technical Specification Group Services and System Aspects, "Study on architecture enhancements for EPS and 5G System to support advanced V2X services", 3GPP TR 23.786, V0.10.0, Jun. 2018, Release 16, pp. 1-13.
Corresponding Japanese Patent Application No. 2019-219284, Office Action dated Aug. 24, 2021. English Translation.

\* cited by examiner

| Destination index$_1$ | LCG ID$_1$ | Buffer Size$_1$ | Oct 1 |
| Buffer Size$_1$ | Destination index$_2$ | | Oct 2 |
| LCG ID$_2$ | Buffer Size$_2$ | | Oct 3 |
| ... | | | |
| Destination index$_{N-1}$ | LCG ID$_{N-1}$ | Buffer Size$_{N-1}$ | Oct 1.5*N-2 |
| Buffer Size$_{N-1}$ | Destination index$_N$ | | Oct 1.5*N-1 |
| LCG ID$_N$ | Buffer Size$_N$ | | Oct 1.5*N |

| Destination index₁ | | LCG ID₁ | Buffer Size₁ | Oct 1 |
|---|---|---|---|---|
| Buffer Size₁ | | Destination index₂ | | Oct 2 |
| LCG ID₂ | Buffer Size₂ | | | Oct 3 |

...

| Destination index_N | | LCG ID_N | Buffer Size_N | | | Oct 1.5*N-0.5 |
|---|---|---|---|---|---|---|
| Buffer Size_N | | R | R | R | R | Oct 1.5*N+0.5 |

FIG. 10 (PRIOR ART)

METHOD AND APPARATUS FOR SUPPORTING ONE-TO-ONE SIDELINK COMMUNICATION IN A WIRELESS COMMUNICATION SYSTEM

CROSS-REFERENCE TO RELATED APPLICATIONS

The present application claims the benefit of U.S. Provisional Patent Application Ser. No. 62/784,631 filed on Dec. 24, 2018, the entire disclosure of which is incorporated herein in its entirety by reference.

FIELD

This disclosure generally relates to wireless communication networks, and more particularly, to a method and apparatus for handling mobility of a UE with one-to-one sidelink communication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of an initiating UE (User Equipment) for establishing a one-to-one sidelink communication with a target UE. In one embodiment, the method includes transmitting a first PC5 signalling used for establishing the one-to-one sidelink communication, wherein the first PC5 signalling includes an identity of the target UE and an identity of a V2X (Vehicle-to-Everything) service.

BRIEF DESCRIPTION OF THE DRAWINGS

FIG. 10 is a reproduction of FIG. 6.1.3.1a-2 of 3GPP TS 36.321 V15.3.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: RAN2 #104 Chairman's Note; 3GPP TR 23.786 V1.0.0, "Study on architecture enhancements for EPS and 5G System to support advanced V2X services"; and TS 36.321 V15.3.0, "Evolved Universal Terrestrial Radio Access (E-UTRA); Medium Access Control (MAC) protocol specification". The standards and documents listed above are hereby expressly incorporated by reference in their entirety.

Figure 1:
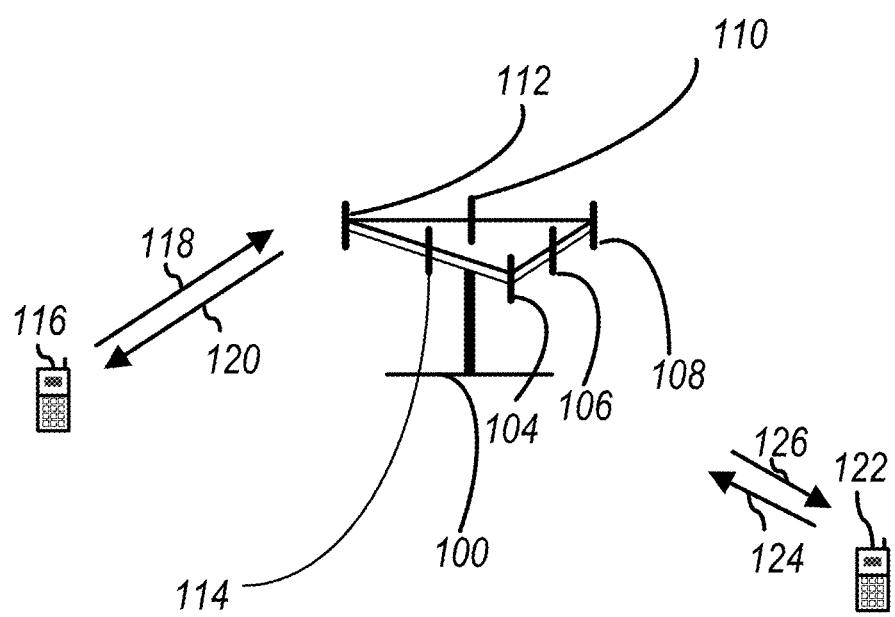
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
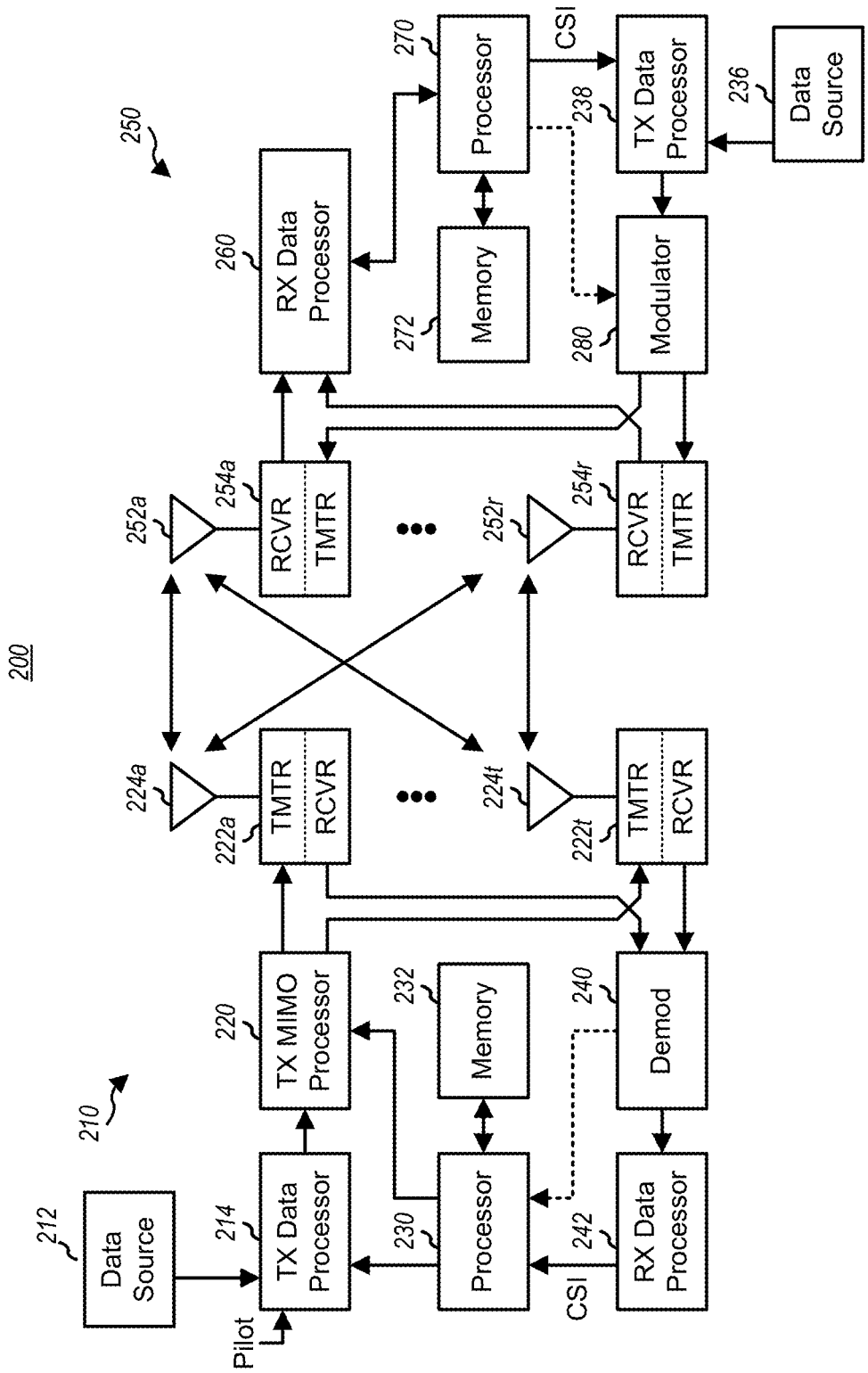
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
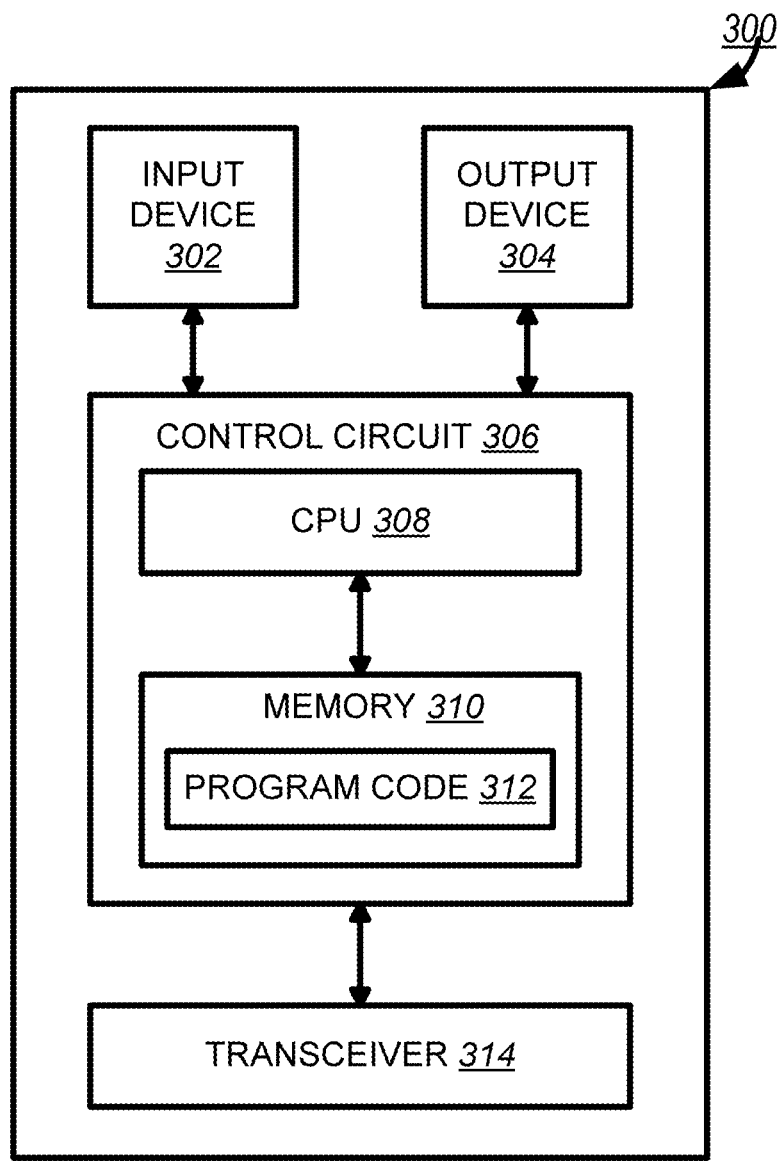
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE or NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
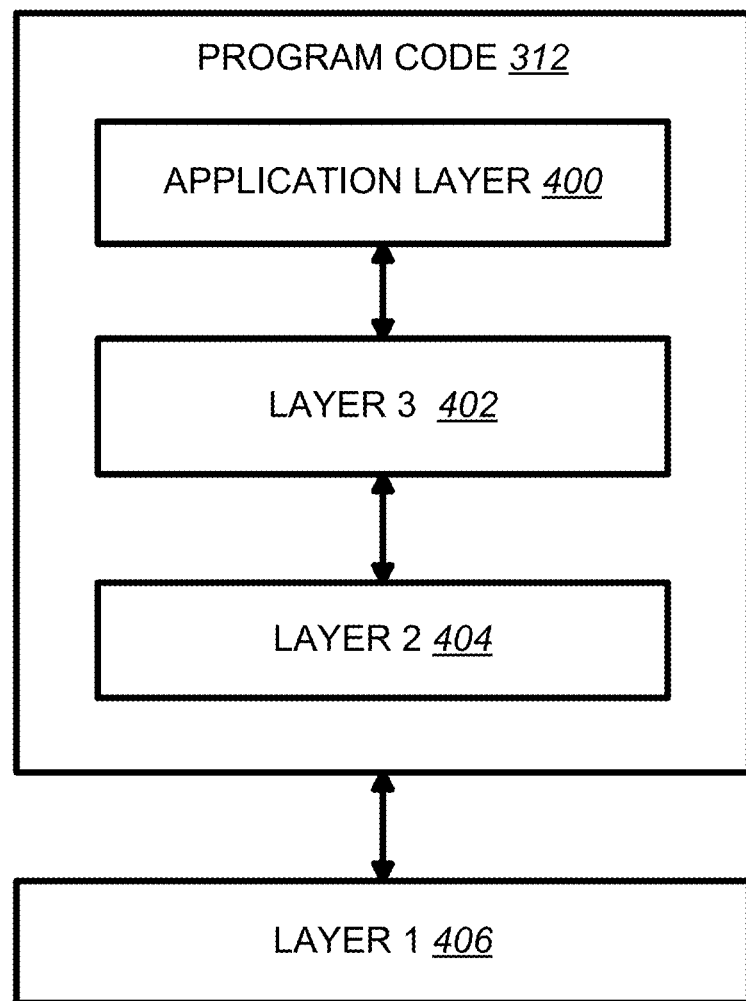
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

As noted in the 3GPP RAN2 #104 Chairman's Note, 3GPP RAN2 #104 meeting made the following agreements on NR (New RAT/Radio) eV2X (enhanced Vehicle to Everything) sidelink communications:

Agreements
1: NR V2X sidelink communication is supported for all RRC_CONNECTED UEs, RRC_IDLE UEs and RRC_INACTIVE UEs (if supported). A UE in RRC_INACTIVE (if supported) performs V2X sidelink communication following the same way as RRC_IDLE UEs, i.e. using cell-specific configurations included in SIB.
2: As in LTE, V2X-specific SIB(s) is needed for NR V2X. It is FFS by RAN2 whether V2X-specific SI should be on-demand SI or not for a cell supporting V2X sidelink communication in NR.
3: For RRC connection establishment for NR V2X sidelink communication, the RRC connection establishment condition for LTE V2X sidelink communication (i.e. concerned frequency included in SIB without Tx pool) is taken as the baseline. It is FFS whether/what new RRC connection establishment condition(s) for V2X sidelink communication are needed in NR, on top of the LTE baseline.
4: RAN2 will support the case a UE can be configured to perform both mode-1 and mode-2 at the same time assuming RAN1 does not have concern on it. FFS on the scenario which it is applicable.
5: For NR V2X sidelink communication during handover, the Tx and Rx operations and configurations during handover in LTE V2X sidelink communication (i.e. using Rx pool and exceptional Tx pool of the target cell configured in HO command) are taken as the baseline. Enhancements for the Tx/Rx operations and configurations during handover are needed for NR V2X sidelink communication, on top of the LTE baseline. Details are FFS.
6: For cell (re)selection in NR V2X sidelink communication, the cell reselection criterion (i.e. prioritizing frequency giving inter-carrier V2X SL configuration) and configuration (i.e. SL-AnchorCarrierFreqList-V2X) in LTE V2X sidelink communication are taken as the baseline. Regarding the cell (re)selection for V2X sidelink communication in NR, it is FFS whether/what new criterion/configuration is needed on top of the LTE baseline. It is up to UE implementation how to minimize the transmission/reception interruption for NR V2X sidelink communication during cell (re)selection.
7: For NR V2X sidelink communication, the reporting of sidelink UE information is needed. The sidelink UE information reporting mechanism in LTE is taken as the baseline. For sidelink UE information in NR, it is FFS what information needs to be included.
8: For sidelink related measurement and reporting in NR, CBR measurement and reporting as well as location reporting are needed. The CBR measurement/reporting mechanism and location reporting mechanism (FFS whether NR signaling supports it) for LTE V2X sidelink communication are taken as the baseline. RAN2 may decide whether any enhancements are needed for sidelink related measurement and reporting mechanism in NR on top of the LTE baseline depending on RAN1 progress.
9: To report the traffic pattern(s) for NR V2X sidelink communication, UE assistance information reporting is needed (at least for periodic traffic pattern). The UE assistance reporting mechanism for LTE V2X sidelink communication is taken as the baseline. RAN2 to further discuss whether/what new information is needed in UE assistance information for NR V2X sidelink communication, on top of the LTE baseline, based on the conclusion of QoS discussion.
10: RAN2 wait for RAN1 conclusions on SL synchronization design before working on the MIB-SL-V2X design in NR PC5 RRC.
11: In NR, PC5-C protocol stack includes at least RRC, RLC, MAC and PHY sub-layers. Whether to have PDCP sub-layer depends on whether any new PC5 RRC message other than MIB-SL is introduced (e.g. outcome of [103bis #38]).

Agreements on MAC:
1: RAN2 will capture L2 packet filtering function with the condition (i.e. if full L1 id is not used in L1 control information). It is FFS whether we need additional filtering function for unicast and groupcast.
2: Sidelink carrier/resource (re-)selection function is supported in NR MAC at least for NR Sidelink broadcast. RAN2 should further study whether LTE operation can be reused for Sidelink carrier/resource (re-)selection function in NR, considering RAN1 progress.
3: Sidelink HARQ transmissions (w/o HARQ feedback) and Sidelink process are supported at least for NR sidelink broadcast. RAN2 should further discuss potential enhancements to sidelink HARQ operation, considering RAN1 progress.
4: Sidelink specific LCP is supported at least for NR sidelink broadcast in NR MAC. RAN2 should further study how Sidelink specific LCP will work.
5: Sidelink Buffer Status Reporting is supported for NR sidelink broadcast, groupcast and unicast in NR MAC.
6: UL/SL TX prioritization is supported for NR sidelink broadcast, groupcast and unicast in NR MAC. Study potential improvements to UL/SL TX prioritization, if necessary e.g. due to potential impact on QoS.
7: RAN2 should additionally study whether and how to enhance SR procedure/configuration, MAC PDU format, HARQ/CSI feedback/procedure (for groupcast and unicast) (if there is any stage 2 RAN2 issue), and configured SL grant transmission in NR MAC.

Agreements on RLC:
8: Segmentation and reassembly of RLC SDUs are supported in NR RLC for NR sidelink broadcast, groupcast and unicast.
9: RLC SDU discard function is supported in NR RLC for NR sidelink broadcast, groupcast and unicast.
10: If SBCCH is used for NR sidelink (dependent on RAN1 decision on synchronization aspect), a NR TM RLC entity is configured to submit/receive RLC PDUs.
11: A NR UM RLC entity is configured to submit/receive RLC PDUs, for user packets of SL broadcast, groupcast and unicast. RLC AM is not supported for broadcast.

Agreements on PDCP:
12: Sidelink packet duplication is supported in NR PDCP for NR sidelink broadcast, groupcast. FFS on unicast.

13: Timer based SDU/PDU discard function is supported in NR PDCP for NR sidelink broadcast, groupcast and unicast.

Agreements on Unicast

1: For AS-level information required to exchange among UEs via sidelink for SL unicast, RAN2 can consider the followings as a baseline and will check if the AS-level information can be agreed and the details after some progress in RAN2, SA2 and RAN1:

UE ID, UE capability, Radio/Bearer configuration, PHY information/configuration (e.g. HARQ, CSI), Resource information/configuration and QoS info 2: AS-level information for SL unicast can be exchanged between gNB and UE for RRC configuration. RAN2 assumes that a UE can provide network with QoS related information and will check if the AS-level information can be agreed and the details after some progress in RAN2, SA2 and RAN1.

3: AS-level information is exchanged via RRC signalling (e.g. PC5-RRC) among UEs via sidelink for SL unicast. New logical channel (SCCH: SL Control Channel) in addition to STCH (SL Traffic Channel) will be also introduced. SCCH carriers PC5-RRC messages.

4: RAN2 will consider both options during SI phase. Further discussion on the definition, procedure and information for each option is needed.

Option 1: AS layer connection establishment procedure by PC5-RRC is also needed.

Option 2: Upper layer connection establishment procedure is enough.

5: RAN2 will study a kind of RRM or RLM based AS level link management. RAN2 will not consider a kind of PC5-RRC level keep alive message based management. Further discussion on possible detailed options is needed.

Agreements on Groupcast

6: Further discussion is needed on whether groupcast follows same mechanism for unicast, which are agreed in the above.

7: No AS-level mechanism to determine a group manager (i.e. head UE) is studied. FFS for platooning, on the visibility of a group manager (head UE) to AS and AS-level functionalities.

Agreements

1: RAN2 assumes that the candidate RAT(s) with SL should be associated with service type by upper layer.

2: RAN2 assumes for a given V2X service type, it may be associated with: 1) LTE RAT only, 2) NR RAT only, FFS on 3) LTE or NR RAT and 4) LTE and NR RAT. We can ask SA2 suggestion/guideline on 3) and 4).

3: RAN2 assumes Tx profile based approach is considered as baseline for RAT selection of SL. RAN2 is suggested to further discuss the RAN2 impacts of V2X service type and RAT mapping approach.

4: RAN2 assumes RAT selection is only applied to V2X broadcast and for any V2X unicast and groupcast service, it is communicated over NR only. We will ask if SA2 has any concern/feedback on it.

5: The availability of Uu/PC5 will be informed to upper layer and the upper layer performs the Uu/PC5 interface selection. FFS on what availability implies, how AS to decide availability of Uu/PC5 and whether we need to specify it.

3GPP TR 23.786 V1.0.0 introduced the following solutions for eV2X communications:

6.11 Solution #11: Solution for Unicast or Multicast for eV2X Communication Over PC5 Reference Point 6.11.1 Functional Description This solution addresses Key Issue #1 on the support of eV2X Group Communication, Key Issue #9 on the support of the unicast/multicast communication over PC5 and Key Issue #4 on the support of PC5 QoS framework enhancement for eV2X, focusing on the following aspects:

Identifiers for the unicast communication, e.g. L2 ID;
Signalling protocol to support unicast/multicast communication;
QoS support and AS layer configurations;
Security associations;
Procedures for the link establishment and maintenance.

6.11.2 Solution Description 6.11.2.1 Identifiers for the Unicast Communication 6.11.2.1.1 Separate L2 ID Address Space for Unicast and Multicast from Those for Broadcast One of the essential identifiers for the unicast/multicast communication is the L2 ID. As of the ProSe design in TS 23.303 [8], the destination L2 ID address space for one-to-one communication and one-to-many communications are separate with AS layer mechanism, i.e. MAC layer version number. This is done to avoid conflicts of the address used that may cause harm to one-to-one communications. In a similar manner, V2X unicast should also use the separate L2 IDs than that for the broadcast and multicast.

This separation applies to both destination L2 ID and source L2 ID. For a UE that has both broadcast and unicast/multicast traffic, different L2 IDs should be used with corresponding formats. The source L2 ID will be used by peer UE as the destination L2 ID in unicast communication. Details of the related L2 ID management for unicast/multicast is described in following clauses.

The UE may use distinct source L2 ID for different unicast one to one communication link e.g. when different unicast links are associated with different upper layer indentifiers.

6.11.2.1.2 Deciding the Destination L2 ID to Use for Unicast/Multicast Communication 6.11.2.1.2.1 Option A In TS 23.285 [5], the Destination L2 ID is decided by the UE based on a configured mapping between PSID/ITS-AID to the L2 ID. This suites for broadcast traffic, but does not work for unicast or multicast traffic. In unicast or multicast, destination L2 ID would not be decided based on PSID/ITS-AID. A V2X UE should be allowed to have multiple unicast connections or multicast groups supported simultaneously for a particular service (PSID/ITS-AID). Therefore, the destination L2 ID information in this case should come from the upper layer. This means that the interface between the V2X layer and upper layer needs to be enhanced to allow such information to be passed down together with the data packet.

It is expected that the actual V2X applications do not understand the notion of L2 ID, as the applications can be built for cross technology or platforms. Therefore, some mid-ware layer within the UE has to translate the identifier used by the application layer, e.g. Station ID, to the V2X L2 ID. It means such mid-ware layer needs to maintain the mapping of application layer destination identifiers and L2 IDs. Since this mid-ware layer is out of scope of SA2, in the specification it can be noted as "upper layer" in general, and the assumption that this "upper layer" maintains the mapping and provides the L2 ID for unicast or multicast communication should be documented.

6.11.2.1.2.2 Option B

An alternative to the above solution is for the V2X layer to manage such unicast link/multicast group to L2 ID mapping. In that case, the unicast link/multicast group can be allocated with a flow identifier at the time of establishment. Corresponding connection profile information, e.g. L2 IDs, transmission settings, QoS parameters, etc., could be associated with it. In such a case, the upper layer only needs to use the flow identifier to indicate the destination and pass it down with the data packet. V2X layer will apply the associated profile information, including the L2 IDs, for the transmission. This would allow the reuse the Uu link handling mechanisms, e.g. similar to that of the QoS Flows, and be more extensible. Again, the translation of the application layer identifiers, e.g. Station ID, to this flow identifier has to be done by this mid-ware layer, i.e. the "upper layer".

6.11.2.2 Signalling Protocol to Support Unicast/Multicast Communication

For unicast or multicast communication, there is a need for some control message exchanged between the UEs involved in order to establish the link or group. Therefore, some signalling protocol is required.

In ProSe one-to-one communication defined in TS 23.303 [8], a PC5 Signalling Protocol (clause 5.1.1.5.2) was introduced, which runs over PDCP layer. Although it is defined for ProSe use, the messages could be extended in order to be used for V2X communication. The detailed protocol design needs to be reviewed based on the actual unicast operation procedures. Another alternative approach is to run RRC over PC5. As PC5 Signalling Protocol is used over PDCP anyway, RRC protocol can be used to replace it. Although not all RRC features are required for PC5 operation, those selected V2X relevant RRC messages can be extended and used, e.g. SidelinkUEInformation, etc. The advantage of that is the potential unification of control signalling protocols for Uu and PC5.

Therefore, in this solution a signalling protocol over PC5 for the unicast/multicast communication management is introduced.

6.11.2.3 QoS Support and AS Layer Configurations

It is desirable that QoS can be support over the unicast and multicast communication as well. In TS 23.285 [5], the QoS model for V2X communication is based on the per packet model, e.g. PPPP and PPPR. With unicast or multicast communication, it should be discussed whether a connection-oriented QoS model similar to that of Uu connection should be supported as well. As also discussed in Key Issue #4 "Support of PC5 QoS framework enhancement for eV2X", something more than existing PPPP and PPPR is expected be required.

Specifically for unicast or multicast, due to the link or group involved, most packets sent over the same unicast link between a pair of peers should have the same QoS characteristics. This is closer to the Uu connection model, rather than the normal broadcast based traffic. Therefore, Uu type of QoS management concept can be reused here. This allow a unified model for Uu and PC5.

In addition, there could be different AS layer features that may be optional or not backward compatible. Therefore, when setting up the unicast link, such configuration could be also negotiated and configured together with/or as part of the QoS profile.

NOTE: The QoS Model for unicast described in Solution #19 (clause 6.19) is used.

6.11.2.4 Security Associations

The unicast or multicast communication may need protection at link layer as well. The ProSe one-to-one communication supports secure L2 link establishment, as defined in TS 33.303 [11]. However, within V2X communication context, each UE has the corresponding certificates for the security protection. Therefore, there may be a need to enhancement or adjust the existing L2 secure link establishment protocol in order to support the use of such security associations. The exact security handling should be analysed and decided by SA3. SA2 design needs to be aligned with those decisions when available.

6.11.2.5 Procedures for the Link Establishment and Maintenance

TS 23.303 [8] has defined the procedures for the establishment and maintenance of secure L2 link over PC5, as in clause 5.4.5. These procedures can be enhanced and adapted for the V2X use, subject to the decisions above regarding signalling protocol choice, security handling, etc. Some addition considerations for the V2X for the link/group handling is required though. For V2X communication, not all UEs will be supporting or use unicast communication. In addition, not all services may be run over the same channel or RAT (e.g. LTE V2X vs. NR V2X). With V2X, there is no discovery channel like that of ProSe (i.e. PC5-D), and there is no assumption on the configuration from network as that of Public Safety use. Therefore, in order to support the link establishment, there is a need for service announcement in order to inform the peer of the existence of the UE and the capability of the UE for the unicast communication, e.g. channel to operate, or the services supported, etc.

Such a service announcement should be made accessible to all the UEs that are interested in using the service. For example, such announcement could be either configured to send over a dedicate channel, similar to how WAVE Service Advertisement (WSA) is handled, or to be piggybacked on the periodical messages from the supporting UEs.

NOTE 1: Service announcement is handled by upper layer and out of scope of SA2.

For layer 2 link maintenance, keep-alive functionality is needed to detect that when the UEs are not in direct communication range, so that they can proceed with implicit layer 2 link release.

NOTE 2: It is left to Stage 3 to determine how keep-alive functionality is supported.

6.11.3 Procedures

6.11.3.1 Establishment of Layer 2 Link Over PC5

Layer-2 link establishment procedure as defined in TS 23.303 [8] clause 5.4.5.2 can be reused for the eV2X unicast link establishment, with the following adaptations:

The messages may be converted to RRC signaling message instead of PC5 signaling message, depends on RAN WG's decision.

"UE oriented layer 2 link establishment" operates as below and FIG. 6.11.3.1-1 shows the procedure:

- The Direct Communication Request message can be sent by UE-1 with broadcast mechanism, i.e. to a broadcast address associated with the application instead of the L2 ID of UE-2. The upper identifier of UE-2 is included in the Direct Communication Request message to allow UE-2 to decide on if to respond to the request. The Source L2 ID of this message should be the unicast L2 ID of the UE-1.
- The Direct Communication Request message should be transmitted using default AS layer setting e.g. broadcast setting, that can be understood by UE-2.
- UE-2 uses the source L2 ID of the received Direct Communication Request message as destination L2 ID in the subsequent signalling to UE-1, and uses its own unicast L2 ID as the source L2 ID. UE-1 obtains UE-2's L2 ID for future communication, for signalling and data traffic.

Figure 5:
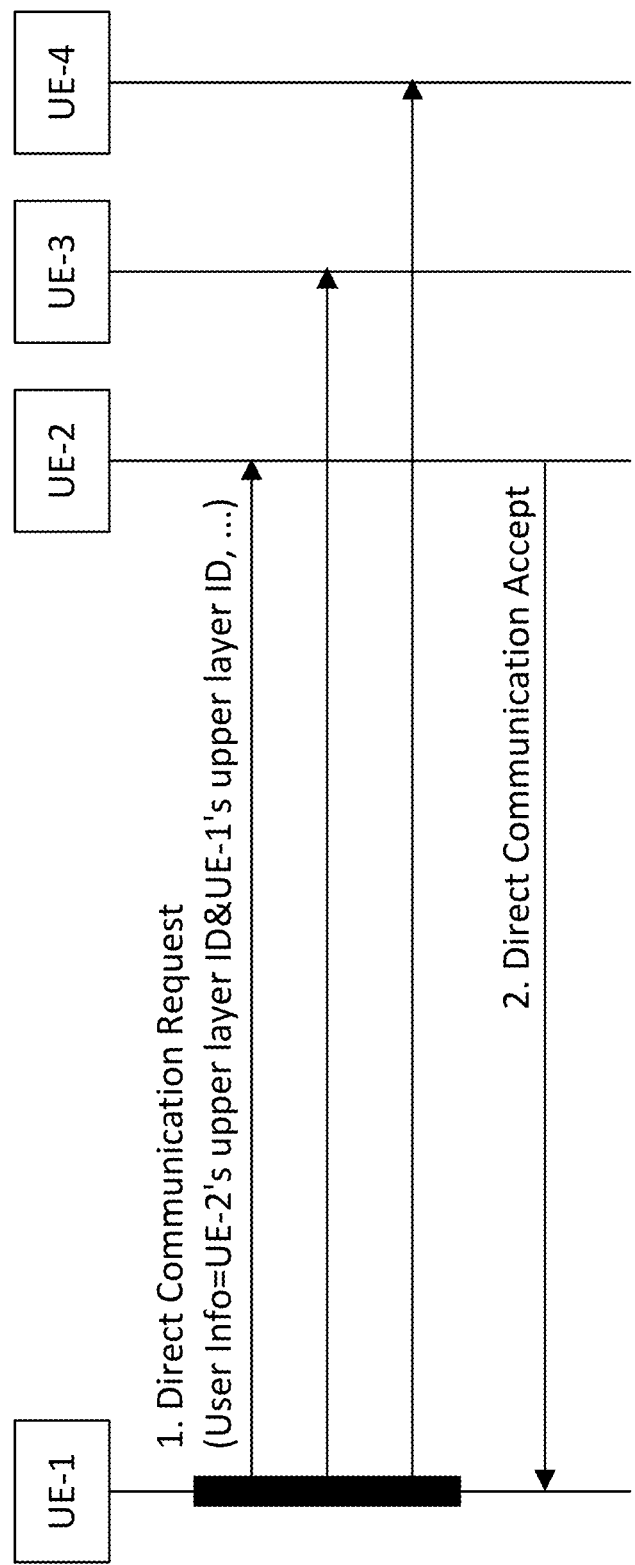
FIG. 5 is a reproduction of FIG. 6.11.3.1-1 of 3GPP TR 23.786 V1.0.0.
Figure 6:
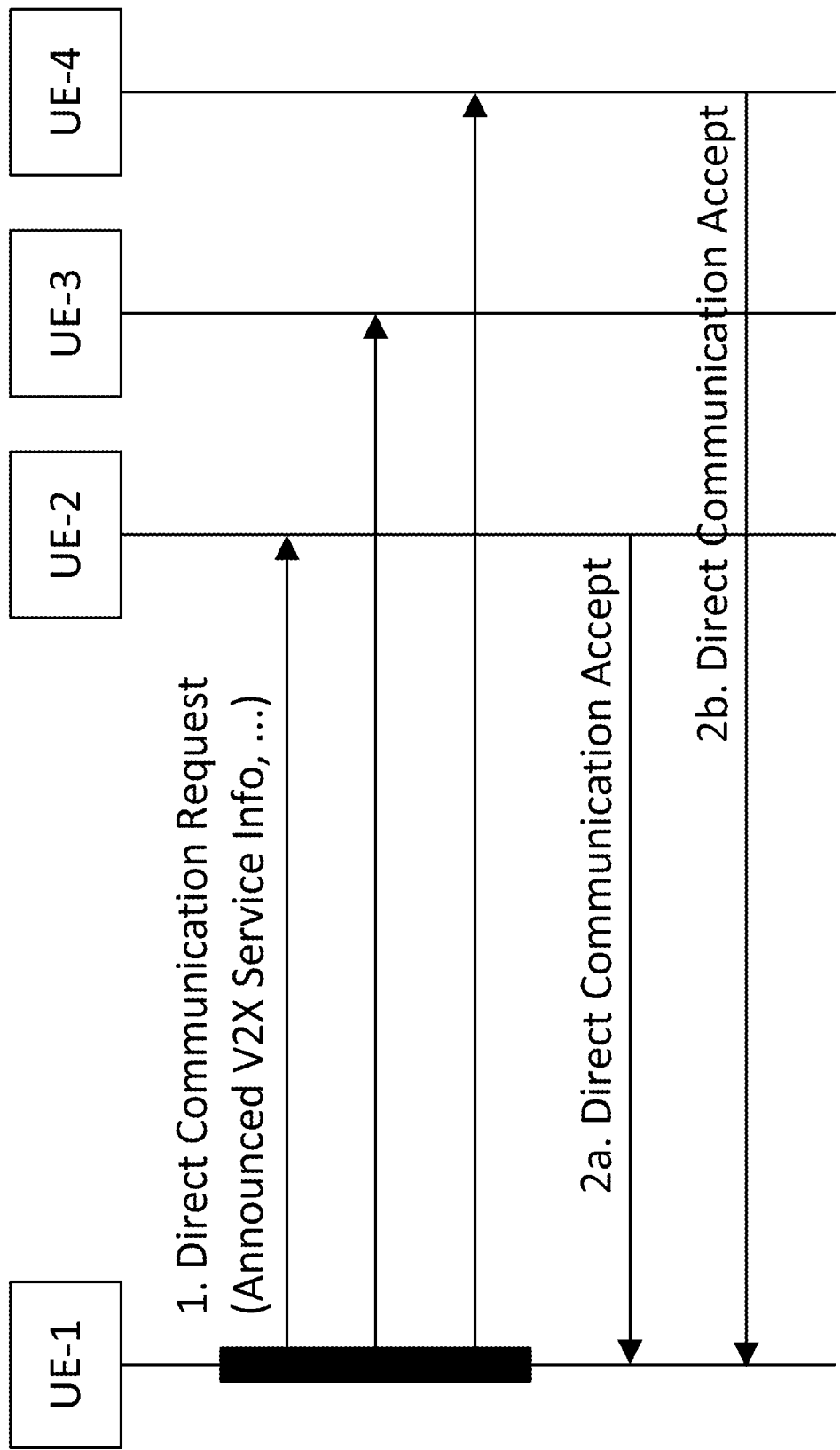
FIG. 6 is a reproduction of FIG. 6.11.3.1-2 of 3GPP TR 23.786 V1.0.0.

FIG. 6.11.3.1-1 of 3GPP TR 23.786 V1.0.0, Entitled "UE Oriented Layer 2 Link Establishment Procedure", is Reproduced as FIG. 5

"V2X Service oriented layer 2 link establishment" operates same to the "UE oriented layer 2 link establishment" with the following differences and FIG. 6.11.3.1-2 shows the procedure:

The information about V2X Service requesting L2 link establishment, i.e. information about the announced V2X Service is included in the Direct Communication Request message to allow other UEs to decide on if to respond to the request.

The UEs that are interested in using the V2X Service announced by the Direct Communication Request message can respond to the request (UE-2 and UE-4 in FIG. 6.11.3.1-2).

After establishing layer 2 link with other UE(s) as described above, new UE(s) can enter proximity with UE-1, i.e. UE-1's direct communication range. In this case, UE-1 may initiate V2X Service oriented layer 2 link establishment procedure as it is aware of new UE(s) from Application Layer messages sent by the UE(s). Or the new UE may initiate V2X Service oriented layer 2 link establishment procedure. Therefore, UE-1 does not have to keep sending a Direct Communication Request message periodically to announce the V2X Service it wants to establish L2 link with other UE for unicast.

FIG. 6.11.3.1-2 of 3GPP TR 23.786 V1.0.0, Entitled "V2X Service Oriented Layer 2 Link Establishment Procedure", is Reproduced as FIG. 6

The layer 2 link supports the non-IP traffic. No IP address negotiation and allocation procedure would be carried out.

6.11.3.2 Contents of the Signalling Message for Link Establishment

The information carried in Direct Communication Request message defined in TS 24.334 [13] requires at least the following updates:

For "UE oriented layer 2 link establishment",
The User Info needs to include the target UE's ID (UE-2's upper layer ID), besides the initiating UE's ID (UE-1's upper layer ID).
NOTE: Stage 3 can decide if these IDs can be carried in the same IE or separate IEs, for example, the Station ID/Vehicle Temp ID only needs to be 4 octets.

For "V2X Service oriented layer 2 link establishment",
The Announced V2X Service Info needs to include the information about V2X Service requesting L2 link establishment, e.g. PSID or ITS-AIDs of the V2X application. Sensor Sharing, and etc can be the case for the V2X Service.

The IP Address Config, which is specified as mandatory for ProSe, should allow an indication that no IP is to be used, such that the receiving UE (e.g. UE-2) would not start any IP configuration procedure for this particular link.

The IEs dedicated for security need to be reviewed by SA3, as the security mechanism for eV2X may be different and requires different IEs.

Additional configuration information regarding the link, e.g. when RRC message is used there may be AS layer configurations.

Figure 7:
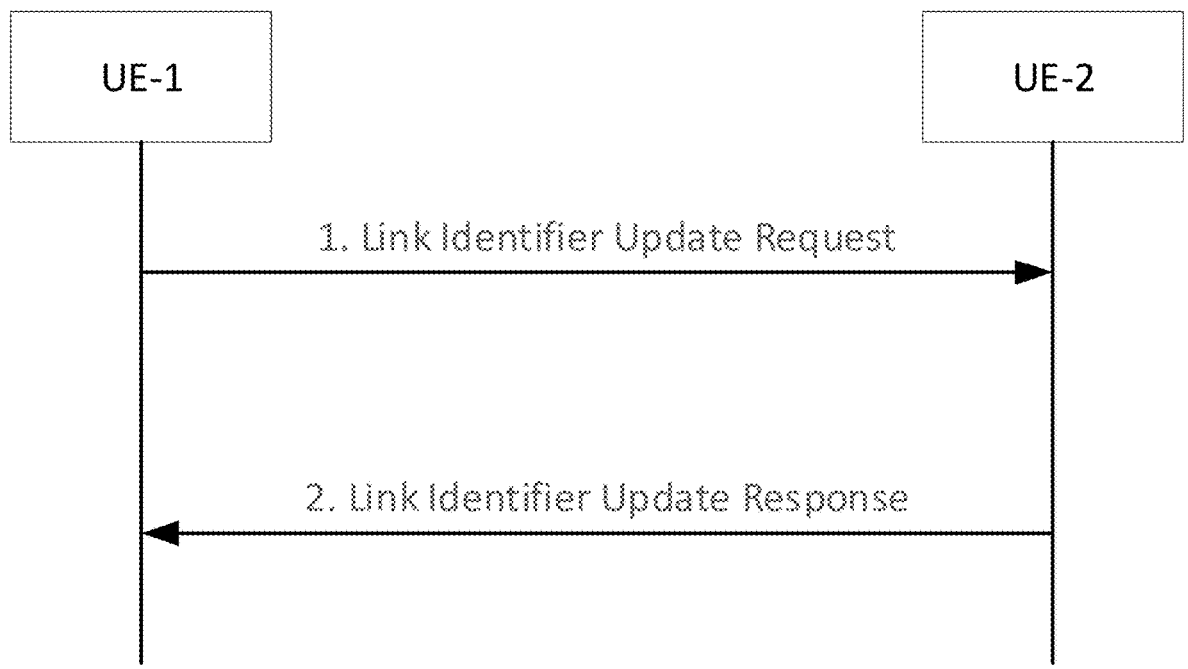
FIG. 7 is a reproduction of FIG. 6.11.3.3-1 of 3GPP TR 23.786 V1.0.0.

6.11.3.3 Link Identifier Update Procedure for Privacy Protection of Unicast Communication FIG. 6.11.3.3-1 of 3GPP TR 23.786 V1.0.0, Entitled "Layer-2 Link Identifier Update Procedure", is Reproduced as FIG. 7

This procedure is used to update the peer in the unicast communication of the impending change of the identifiers used for this link. Due to the privacy requirements, in eV2X use, UE should frequently change its identifiers in order to avoiding being trackable by 3rd party. When the identifier change happens, all identifiers across all the layers, i.e. from application layer ID to L2 ID, need to be changed. This signaling is required before the identifier changes happen, to prevent service interruptions.

1. UE-1 decides the change of identifiers, e.g. due to the upper layer identifier change or a timer, and includes the new identifiers to use (including the new upper layer identifiers, new IP address/prefix if application, new L2 IDs) in the Link Identifier Update Request message, and send to UE-2 before it changes the identifiers. The new identifiers to use should be cyphered to protect privacy.

NOTE 1: The timer is running on a per Source L2 ID.

2. UE-2 respond with a Link Identifier Update Response message. Upon reception of the message, UE-1 and UE-2 can start to use the new identifiers for the data traffic. UE-1 shall receive traffic on its old L2 ID until it receives the Link Id Update Response from UE-2.

NOTE 2: If there are multiple links from UE-1 using the same upper layer identifiers or L2 IDs, UE-1 needs to perform the update procedure over each of the link and for each link needs to keep receiving traffic on its old L2 ID for that specific link until it receives the Link Id Update Response.

6.11.3.4 Security Aspects for Layer 2 Link

As the eV2X applications have associated security certificates, the unicast link can reuse those to derive the security association for protecting the signalling or data of the unicast link.

6.11.4 Impact on Existing Entities and Interfaces
Editor's note: Impacts on existing nodes or functionality will be added.

6.11.5 Topics for Further Study
None.

6.11.6 Conclusions

Solution documented in clauses 6.11.1 to 6.11.4 addressed all the aspects of Key Issue #9 Support of unicast/multicast for sensor sharing over PC5, and should move to normative phase. Following aspects will be further updated based on feedbacks from other Working Groups:

the signalling message definition for unicast link establishment and management, e.g. if and how RRC signalling is used for unicast link;

the choice of per packet QoS model or bearer based QoS model for broadcast, groupcast, and unicast based on RAN decisions;

signal to the base station regarding the service used when network scheduled mode is used;

the potential security related procedure updates for unicast communication over PC5.

NOTE: The application layer may use unicast or groupcast communication mechanism for different applications, e.g. platooning applications.

[ . . . ]

6.19 Solution #19: QoS Support for eV2X Communication Over PC5 Interface 6.19.1 Functional Description 6.19.1.1 General Description This solution addresses Key Issue #4 (clause 5.4) Support of PC5 QoS framework enhancement for eV2X. The QoS requirements for eV2X are different from that of the EPS V2X, and the previous defined PPPP/PPPR in TS 23.285 [5] are considered not to satisfy the needs. Specifically, there are much more QoS parameters to consider for the eV2X services. This solution proposes to use 5QI for eV2X communication over PC5 interface. This allows a unified QoS model for eV2X services over different links.

6.19.1.2 Solution Description

The new service requirements were captured in TS 22.186 [4]. The new performances KPIs were specified with the following parameters:

Payload (Bytes);
Transmission rate (Message/Sec);
Maximum end-to-end latency (ms);
Reliability (%);
Data rate (Mbps);
Minimum required communication range (meters).

Note that the same set of service requirements apply to both PC5 based V2X communication and Uu based V2X communication. As analysed in Solution #2 (clause 6.2), these QoS characteristics could be well represented with 5QI defined in TS 23.501 [7].

It is therefore possible to have a unified QoS model for PC5 and Uu, i.e. also use 5QIs for V2X communication over PC5, such that the application layer can have a consistent way of indicating QoS requirements regardless of the link used. This does not prevent the AS layer from implementing different mechanisms over PC5 and Uu to achieve the QoS requirements. Considering the 5GS V2X capable UEs, there are three different types of traffic: broadcast, multicast, and unicast.

The UE-PC5-AMBR is applied to all types of traffic and is used for the RAN for capping the UE PC5 transmission in the resources management.

For unicast type of traffic, it is clear that the same QoS Model as that of Uu can be utilized, i.e. each of the unicast link could be treated as a bearer, and QoS flows could be associated with it. All the QoS characteristics defined in 5QI and the additional parameter of data rate could apply. In addition, the Minimum required communication range could be treated as an additional parameter specifically for PC5 use.

For broadcast traffic, there is no bearer concept. Therefore, each of the message may have different characteristics according to the application requirements. The 5QI should then be used in the similar manner as that of the PPPP/PPPR, i.e. to be tagged with each of the packet. 5QI is able to represent all the characteristics needed for the PC5 broadcast operation, e.g. latency, priority, reliability, etc. A group of V2X broadcast specific 5QIs (i.e. VQIs) could be defined for PC5 use.

NOTE 1: The 5QI used for PC5 may be different from that used for Uu even for the same V2X service, e.g. the PDB for the PC5 can be longer than that for the Uu as it is a direct link. The 5QIs used for PC5 is named VQI for differentiation.

NOTE 2: A mapping between the EPS V2X QoS parameters, e.g. PPPP and PPPR, with the new VQIs, e.g. similar to the non-GBR 5QIs defined in TS 23.501 [7], will be defined in normative phase for broadcast operation.

NOTE 3: The working assumption is that NR PC5 design support the use of V2X 5QIs.

NOTE 4: AS layer may handle unicast, groupcast and broadcast traffic by taking all their priorities, e.g. indicated by VQI, into account.

6.19.1.3 V2X 5QI (VQI) Values for PC5 Broadcast Use

A set of new VQIs for V2X use will be defined in normative phase reflecting the service requirements documented in TS 22.186 [4].

NOTE 1: The working assumption is that non-standardized VQI is not supported in this release.

NOTE 2: Whether per packet or per QoS flow QoS Model is used depends on RAN decision.

6.19.2 Procedures

Editor's note: This clause describes procedures to use the new QoS model for PC5 communication. It depends on RAN development as well.

6.19.2.1 QoS Support for Unicast Communication Over PC5 Interface 6.19.2.1.0 General To enable QoS support for eV2X one-to-one communication over PC5 interface, the followings procedures need to be supported.

Editor's note: The following procedures may be further updated depending on the progress on PC5 QoS Model.

6.19.2.1.1 QoS Parameters Provision to UE and NG-RAN

The PC5 QoS parameters and PC5 QoS rule are provisioned to the UE as part of service authorization parameters using the solution defined for Key Issue #5. The PC5 QoS rule is used to map the V2X services (e.g. PSID or ITS-AIDs of the V2X application) to the PC5 QoS flow. The PC5 QoS parameters retrieved by the PCF from the UDR are provided to the NG-RAN via AMF. The AMF stores such information as part of the UE context. For subsequent procedures (e.g., Service request, Handover), the provision of the PC5 QoS parameters via N2 will follow the description as per clause 6.6.2.

NOTE 1: The UE-PC5-AMBR is provided by the UDM and the details will follow the description as per Solution #6. The PC5 QoS parameters provisioning to the UE and NG-RAN could be triggered by the UE Policy container included in the NAS message provided by the UE. The PCF sends to the AMF the updated PC5 QoS parameters for NG-RAN when needed.

NOTE 2: The detailed PC5 QoS parameters used by NG-RAN will be identified during the normative work phase.

NOTE 3: NG-RAN is configured with static parameters for network scheduled resources allocation mode to support PC5 QoS.

6.19.2.1.2 QoS Parameters Negotiation Between UEs

The PC5 QoS parameters are negotiated at the establishment of one-to-one communication procedure, so the one-to-one communication establishment procedure defined in TS 23.303 [8] is enhanced to support PC5 QoS parameters negotiation between two UEs. After the PC5 QoS parameters negotiation procedure, the same QoS is used in both directions.

Figures 8, 9:
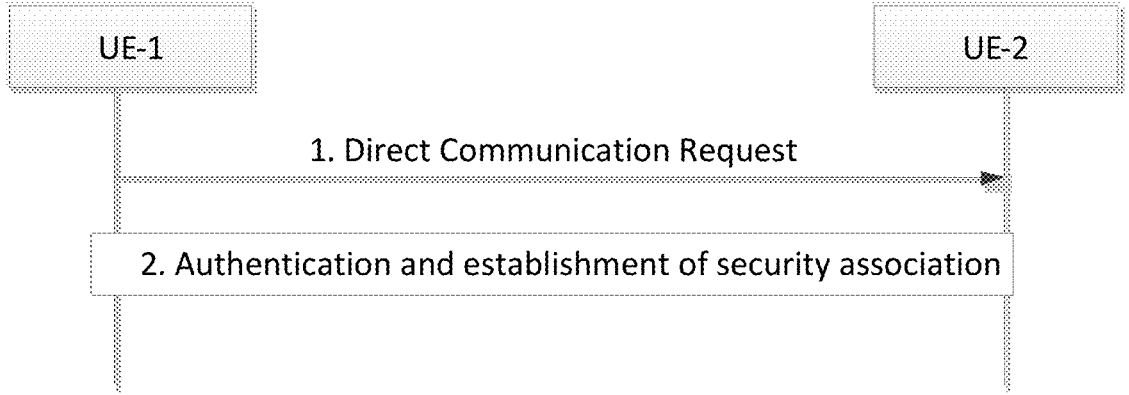
FIG. 8 is a reproduction of FIG. 6.19.2.1.2-1 of 3GPP TR 23.786 V1.0.0.
FIG. 9 is a reproduction of FIG. 6.1.3.1a-1 of 3GPP TS 36.321 V15.3.0.

FIG. 6.19.2.1.2-1 of 3GPP TR 23.786 V1.0.0, Entitled "Establishment of Secure Layer-2 Link Over PC5", is Reproduced as FIG. 8

UEs engaged in one to one communication negotiate PC5 QoS parameters during the link establishment procedure.

1. UE-1 sends a Direct Communication Request message to UE-2 in order to trigger mutual authentication. This message includes the requested PC5 QoS parameters.

2. UE-2 initiates the procedure for mutual authentication. The UE-2 includes the accepted PC5 QoS parameters in the Response message.

NOTE: This procedure is aligned with Solution #11 (clause 6.11).

6.19.2.1.3 QoS Handling for eV2X Communication

When PC5 unicast is used for the transmission of eV2X messages, the following principles are applied for both network scheduled operation mode and UE autonomous resources selection mode:

PC5 QoS parameters defined in clause 6.19.1.2 applies to the eV2X communication over PC5.

The eV2X message is sent on the PC5 QoS flow established using the procedure described in clause 6.19.2.1.2.

The mapping of application layer eV2X message to PC5 QoS parameters is based on the PC5 QoS rule.

When the network scheduled operation mode is used, following additional principles apply:

UE provides PC5 QoS parameter information to the gNB for resources request.

When the gNB receives a request for PC5 resource from a UE, the gNB can authorize the requested PC5 QoS parameter based on the PC5 QoS parameters received from AMF.

gNB can use the PC5 QoS parameter information for PC5 QoS handling.

When the autonomous resources selection mode is used, following additional principle applies:

The UE can use the PC5 QoS parameter for PC5 QoS handling based on the provisioned information described in clause 6.19.2.1.1.

6.19.2.2 QoS Support for Broadcast Communication Over PC5 Interface

When PC5 broadcast is used for the transmission of eV2X messages, the following principles are followed for both network scheduled operation mode and UE autonomous resources selection mode:

PC5 QoS parameters (e.g. VQI) defined in clause 6.19.1.2 applies to the eV2X communication over PC5.

The application layer sets the PC5 QoS parameters for each eV2X message when passing it to V2X layer for transmission.

When the network scheduled operation mode is used, following additional principles apply:

UE provides PC5 QoS information reflecting PC5 QoS parameters to the gNB for resources request.

gNB can use the PC5 QoS information reflecting PC5 QoS parameters for QoS handling.

When the autonomous resources selection mode is used, following additional principle applies:

The UE can use the PC5 QoS parameters for PC5 QoS handling.

NOTE: The choice of per packet QoS model or bearer based QoS model for broadcast is based on RAN decisions.

6.19.2.3 QoS Support for Group Communication Over PC5 Interface

The procedure on QoS support for group communication over PC5 interface is described in clause 6.21.2 (Solution #21).

6.19.3 Impact on Existing Entities and Interfaces

Following are the impacts to the UE and other NFs:

UE needs to support new QoS model for PC5 communication.

AMF provides NG-RAN with the QoS parameters for PC5 communication fetched from PCF in associating N2 messages for different procedures.

NG-RAN receives QoS parameters for PC5 communication from AMF and enforces QoS parameter for the network schedule mode.

UDR stores QoS parameters for PC5 communication.

Editor's note: It is FFS if mapping of PPPP, PPPR to the new VQI would be necessary for broadcast traffic.

6.19.4 Topics for Further Study

Editor's note: This clause describes topics for further study.

6.19.5 Conclusions

The solution captured in clauses 6.19.1 to 6.19.3 should move to normative phase.

3GPP TS 36.321 V15.3.0 states:

6.1.3.1a Sidelink BSR MAC Control Elements

Sidelink BSR and Truncated Sidelink BSR MAC control elements consist of one Destination Index field, one LCG ID field and one corresponding Buffer Size field per reported target group. The Sidelink BSR MAC control elements are identified by MAC PDU subheaders with LCIDs as specified in table 6.2.1-2. They have variable sizes.

For each included group, the fields are defined as follows (FIGS. 6.1.3.1a-1 and 6.1.3.1a-2):

Destination Index: The Destination Index field identifies the ProSe Destination or the destination for V2X sidelink communication. The length of this field is 4 bits. The value is set to the index of the destination reported in destinationInfoList for sidelink communication or is set to one index among index(es) associated to same destination reported in v2x-DestinationInfoList for V2X sidelink communication. If multiple such lists are reported, the value is indexed sequentially across all the lists in the same order as specified in [8];

LCG ID: The Logical Channel Group ID field identifies the group of logical channel(s) which buffer status is being reported. The length of the field is 2 bits;

Buffer Size: The Buffer Size field identifies the total amount of data available across all logical channels of a LCG of a ProSe Destination after all MAC PDUs for the TTI have been built. The amount of data is indicated in number of bytes. It shall include all data that is available for transmission in the RLC layer and in the PDCP layer; the definition of what data shall be considered as available for transmission is specified in [3] and [4] respectively. The size of the RLC and MAC headers are not considered in the buffer size computation. The length of this field is 6 bits. The values taken by the Buffer Size field are shown in Table 6.1.3.1-1;

R: Reserved bit, set to "0".

Buffer Sizes of LCGs are included in decreasing order of the highest priority of the sidelink logical channel belonging to the LCG irrespective of the value of the Destination Index field.

FIG. 6.1.3.1a-1 of 3GPP TS 36.321 V15.3.0, Entitled "Sidelink BSR and Truncated Sidelink BSR MAC control element for even N", is reproduced as FIG. 9

FIG. 6.1.3.1a-2 of 3GPP TS 36321 V15.3.0, Entitled "Sidelink BSR and Truncated Sidelink BSR MAC Control Element for Odd N", is Reproduced as FIG. 10

Figure 11:
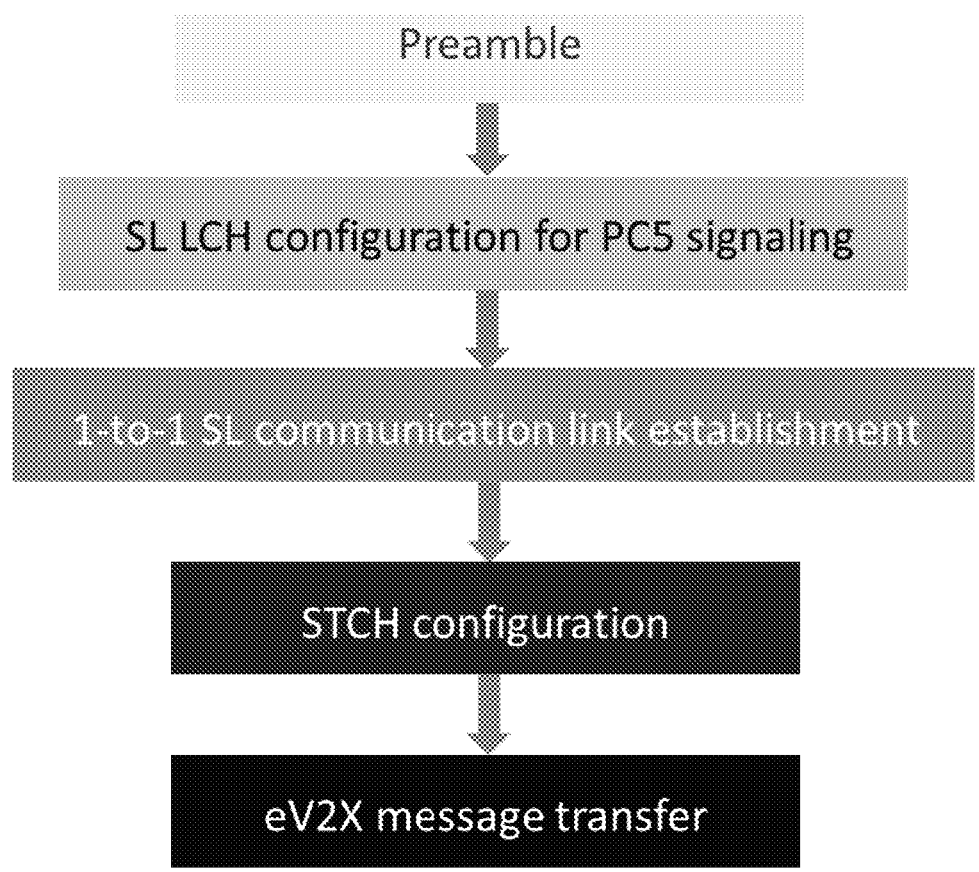
FIG. 11 is a diagram according to one exemplary embodiment.
Figure 12:
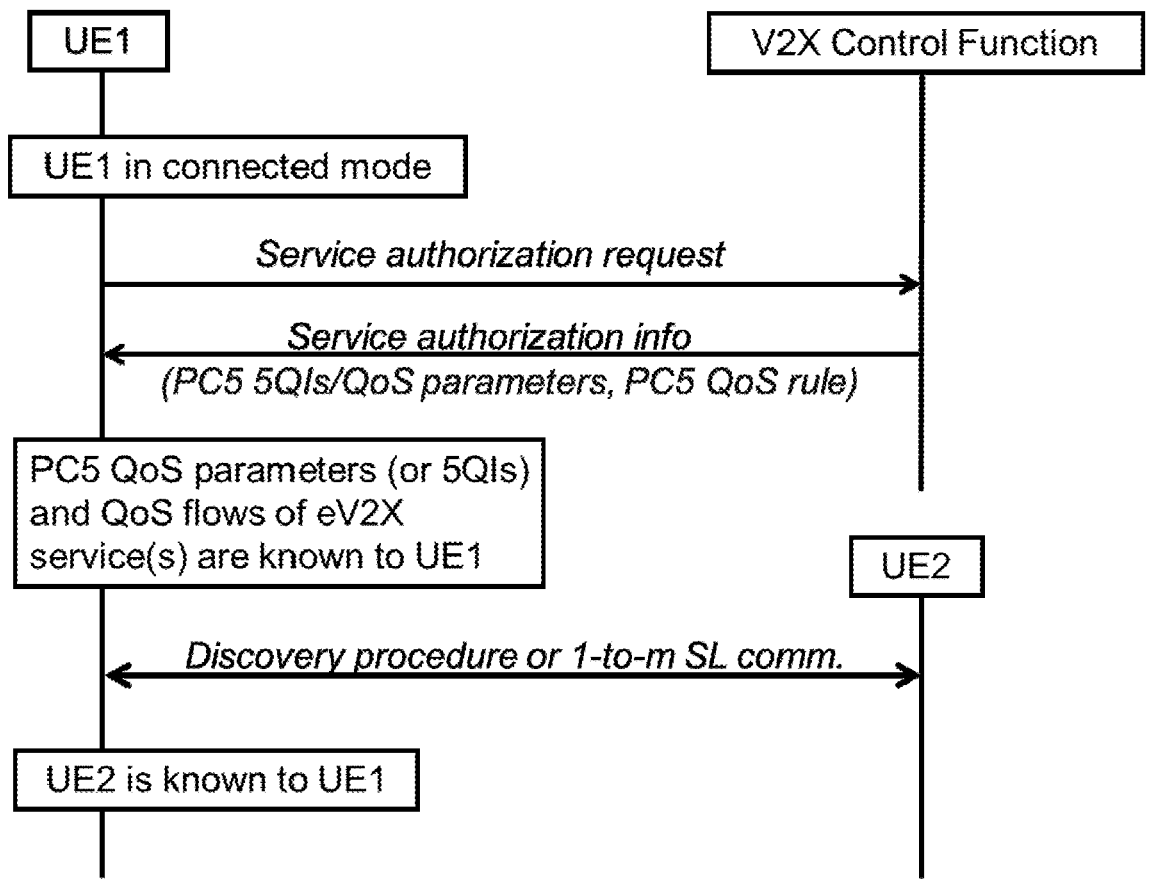
FIG. 12 is a diagram according to one exemplary embodiment.

In the 3GPP RAN2 #104 Chairman's note, a solution for unicast (i.e. one-to-one) or multicast (i.e. one-to-many) for V2X communication over PC5 reference point was introduced. Based on this solution, a UE-1 (i.e. the initiating UE) transmits a Direct Communication Request message to a UE-2 (i.e. the target UE) during a layer-2 link establishment used for unicast link establishment. In response to reception of the Direct Communication Request message, UE-2 responses a Direct Communication Accept to the UE-1. As illustrated in FIG. 11 and discussed below, phases of one-to-one sidelink communication for V2X service on top of the solution in the 3GPP RAN2 #104 Chairman's note are introduced:

I. Preamble (Illustrated in FIG. 12)

In this phase, UE-1 may be in RRC_CONNECTED state (or mode). In case UE-1 is interested in V2X service(s), the UE-1 could request core network (e.g. V2X Control Function) for service authorization. Possibly, UE-1 could be provided or configured with PC5 QoS (Quality of Service) information (e.g. PC5 5QI/QoS parameters, PC5 QoS rule, etc.) for the V2X service(s) during the service authorization. After complete of the service authorization, UE-1 could be aware of the presence of UE-2 via, such as a discovery procedure or a one-to-many sidelink communication (i.e. reception of a V2X message transmitted by the UE-2 in proximity of UE-1). It is noted that 5QI (5G QoS identifier) may also be called VQI (V2X QoS identifier).

Figure 13:
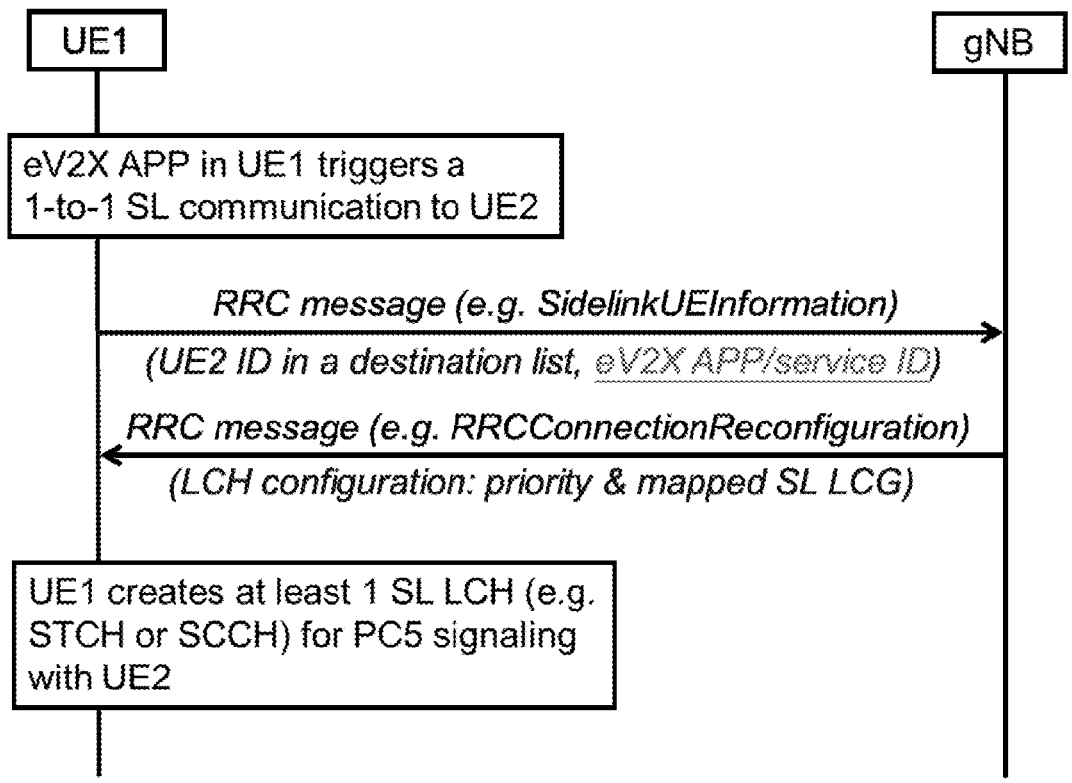
FIG. 13 is a diagram according to one exemplary embodiment.

II. SL LCH Configuration for PC5 Signaling (Illustrated in FIG. 13)

In one embodiment, a V2X application in the UE-1 may trigger a one-to-one sidelink communication to the UE-2. In this situation, it could transmit a first RRC (Radio Resource Control) message (i.e. SidelinkUEInformation) to a base station (or gNB) to request assignment of transmission resources for PC5 control signaling.

In the first RRC message, the content could include at least one of the following:
  A destination identity of the UE-2, which may be included in a destination list;
  An identity of the V2X application (e.g. ITS-AID); and/or
  An identity of the service provided by the V2X application (e.g. PSID).

In response to reception of the first RRC message, base station could transmit a second RRC message (e.g. RRC-ConnectionReconfiguration) to the UE-1 to assign RRC configuration.

In the second RRC message, the content could include at least one of the following:
  Identity of a sidelink logical channel used for PC5 control signalling, e.g. SCCH (Sidelink Control Channel);
  Priority of the sidelink logical channel; and/or
  Identity of a logical channel group (LCG) for the sidelink logical channel.

With the second RRC message, UE-1 could create a sidelink logical channel used for PC5 control signaling. The sidelink logical channel could be used for transmission of a Direct Communication Request message to the UE-2. The Direct Communication Request message could be a RRC message or a NAS (Non-Access Stratum) message.

Figure 14:
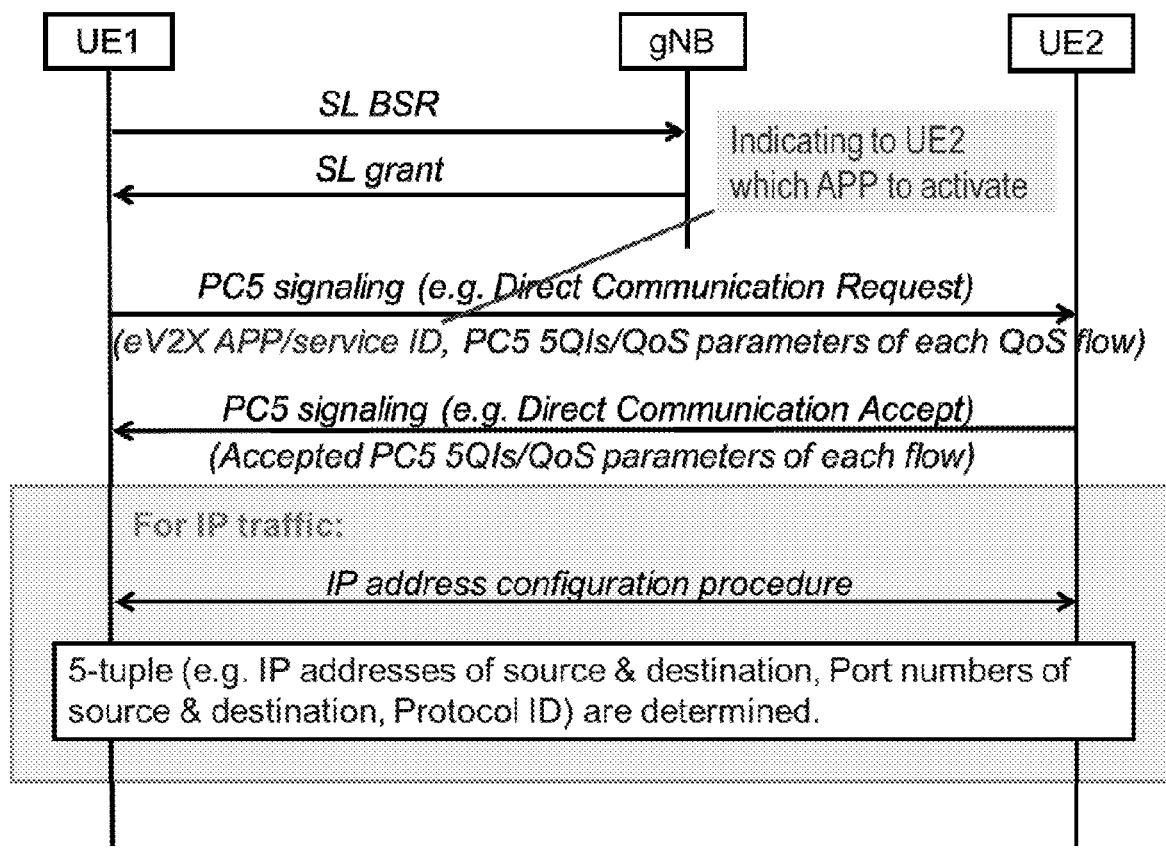
FIG. 14 is a diagram according to one exemplary embodiment.

III. One-to-One Sidelink Communication Link Establishment (Illustrated in FIG. 14)

When the Direct Communication Request message is available for sidelink transmission, UE-1 could transmit a sidelink buffer status report to the base station for allocating sidelink resource for the sidelink transmission of the Direct Communication Request message. After the sidelink resource for the sidelink transmission of the Direct Communication Request message is received, UE-1 could perform the sidelink transmission based on the sidelink resource.

In one embodiment, the Direct Communication Request message could include at least one of the following:
  An identity of the V2X application used to indicate the UE-2 which application to activate;
  An identity of the service provided by the V2X application used to indicate the UE-2 which service to activate;
  (Requested) PC5 5QI of a QoS flow for the V2X application or V2X service; and/or
  (Requested) PC5 QoS parameters/levels/profiles of a QoS flow for the V2X application or V2X service.

UE-1 could receive a Direct Communication Accept message from the UE-2. Possibly, the Direct Communication Accept message could include at least one of the following:
  (Accepted) PC5 5QI of a QoS flow for the V2X application or V2X service;
  (Accepted) PC5 QoS parameters/levels/profiles of a QoS flow for the V2X application or V2X service.

After exchanging the Direct Communication Request message and the Direct Communication Accept message, UE-1 and the UE-2 could perform an IP address configuration procedure for determining 5-tuple (e.g. source IP addresses, destination IP addresses, source port number, destination port number and protocol ID) for the one-to-one sidelink communication. It may also be possible that IP address configuration procedure is done with the Direct Communication Request message and the Direct Communication Accept message (i.e. both procedures are combined into one).

IV. STCH Configuration (Illustrated in FIGS. 15A-15D)

Figure 15A:
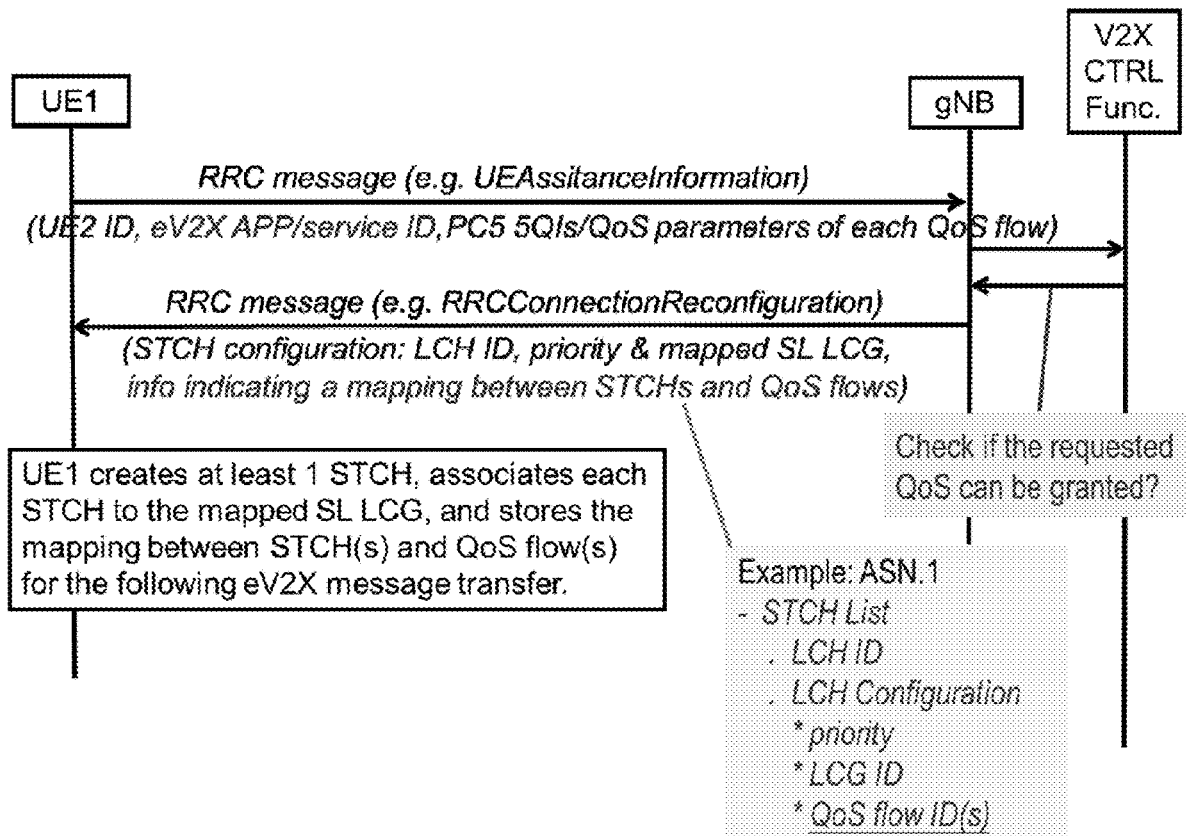
FIGS. 15A-15D are diagrams according to one exemplary embodiment.

As illustrated in FIG. 15A, after finishing the one-to-one sidelink communication link establishment, UE-1 could transmit a RRC message (e.g. UEAssistanceInformation) to the base station to request assignment of transmission resources for the one-to-one sidelink communication.

In the RRC message, the content could include at least one of the following:
  An identity of the UE-2;
  An identity of the V2X application;
  An identity of the service provided by the V2X application;
  PC5 5QI of a QoS flow for the V2X application or V2X service; and/or
  PC5 QoS parameters, levels, or profiles of a QoS flow for the V2X application or V2X service.

With the RRC message, the base station could verify the PC5 5QI of the Qos flow and/or the PC5 QoS parameters, levels, or profiles of the QoS flow with a core network (e.g. V2X Control Function). The base station could then transmit a reconfiguration message (e.g. RRCConnectionReconfiguration, a RRC message) to UE-1 in response to reception of the RRC message.

A list of sidelink logical channel (e.g. STCH (Sidelink Traffic Channel)) could be included in the reconfiguration message, and for each sidelink logical channel the reconfiguration message could include at least one of the following:
  An identity of a sidelink logical channel used for sidelink traffic;
  A priority of the sidelink logical channel;
  An identity of a sidelink logical channel group (LCG) associated with the sidelink logical channel; and/or
  An identity of a QoS flow mapped to the sidelink logical channel.

Based on the above reconfiguration message, UE-1 could create at least a sidelink logical channel (e.g. STCH) for the one-to-one sidelink communication. Furthermore, UE-1 could associate the sidelink logical channel with a corresponding sidelink LCG. Furthermore, UE-1 could store a mapping of a QoS flow to the corresponding sidelink logical channel.

Figure 15B:
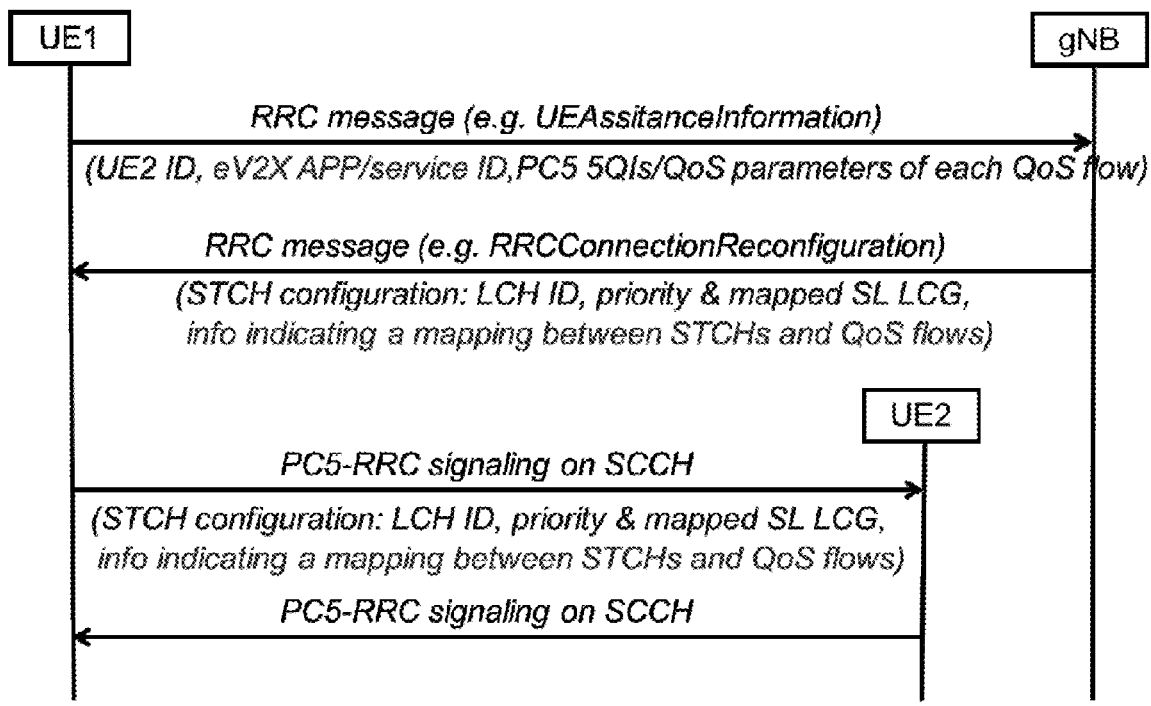

As illustrated in FIG. 15B, if UE-1 and UE-2 are served by a same base station, UE-1 and UE-2 could share the content of the reconfiguration message used by UE-1 (since QoS requirement should be the same for UE-1 and UE-2 on the V2X application). UE-1 could transmit a PC5-RRC message on a sidelink logical channel used for control signalling (e.g. SCCH) to UE-2. The content of the PC5-RRC message could be created based on the content of the reconfiguration message. The content of the PC5-RRC message could be applied by UE-2 for transmitting user traffic of the V2X application over the one-to-one sidelink communication between UE-1 and UE-2.

A list of sidelink logical channel could be included in the PC5-RRC message, and for each sidelink logical channel, the PC5-RRC message could include at least one of the following:
- An identity of a sidelink logical channel used for user traffic;
- A priority of the sidelink logical channel;
- An identity of a sidelink logical channel group (LCG) associated with the sidelink logical channel; and/or
- An identity of a QoS flow mapped to the sidelink logical channel.

Based on the PC5-RRC message, UE-2 could create at least a sidelink logical channel for the V2X application. Furthermore, UE-2 could associate the sidelink logical channel with a corresponding sidelink LCG. In addition, UE-2 could store a mapping of a QoS flow to the corresponding sidelink logical channel.

Figure 16:
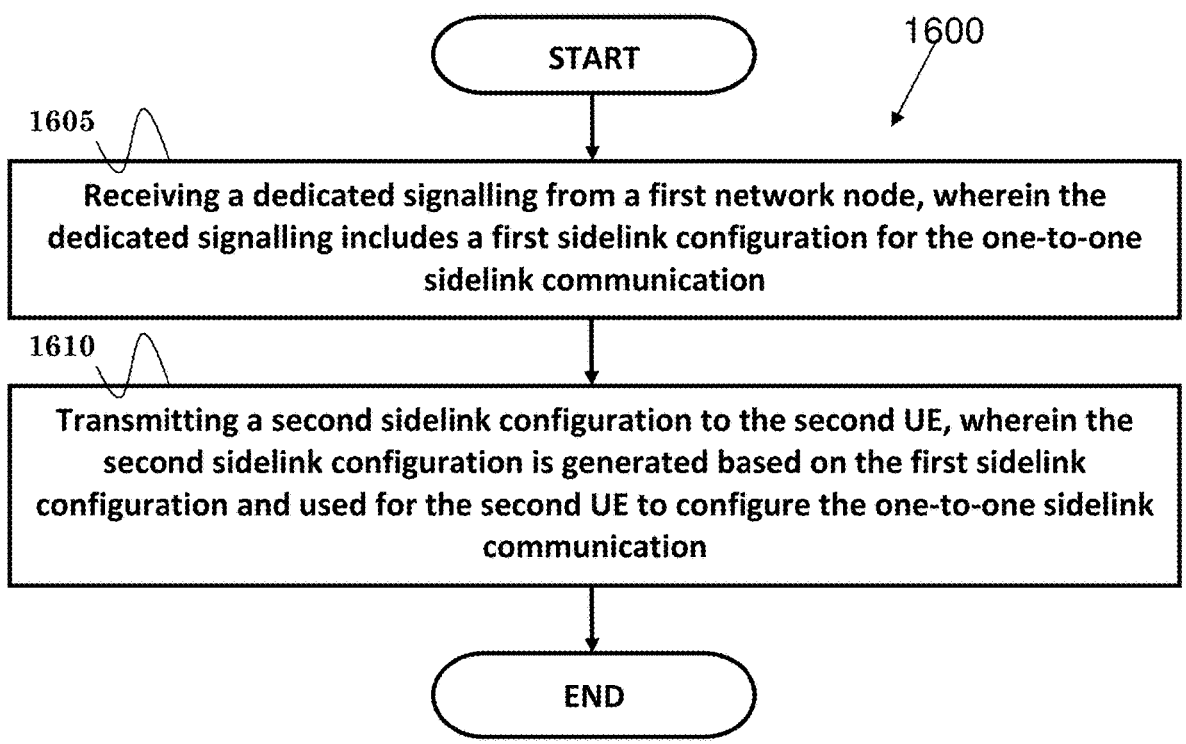
FIG. 16 is a flow chart according to one exemplary embodiment.

FIG. 16 is a flow chart 1600 according to one exemplary embodiment from the perspective of a first UE performing a one-to-one sidelink communication with a second UE. In step 1605, the first UE receives a dedicated signalling from a first network node, wherein the dedicated signalling includes a first sidelink configuration for the one-to-one sidelink communication. In step 1610, the first UE transmits a second sidelink configuration to the second UE, wherein the second sidelink configuration is generated based on the first sidelink configuration and used for the second UE to configure the one-to-one sidelink communication.

Referring back to FIGS. 3 and 4, in one exemplary embodiment of a first UE performing a one-to-one sidelink communication with a second UE, the device 300 includes a program code 312 stored in the memory 310. The CPU 308 could execute program code 312 to enable the UE (i) to receive a dedicated signalling from a first network node, wherein the dedicated signalling includes a first sidelink configuration for the one-to-one sidelink communication, and (ii) to transmit a second sidelink configuration to the second UE, wherein the second sidelink configuration is generated based on the first sidelink configuration and used for the second UE to configure the one-to-one sidelink communication. Furthermore, the CPU 308 can execute the program code 312 to perform all of the above-described actions and steps or others described herein.

Figure 17:
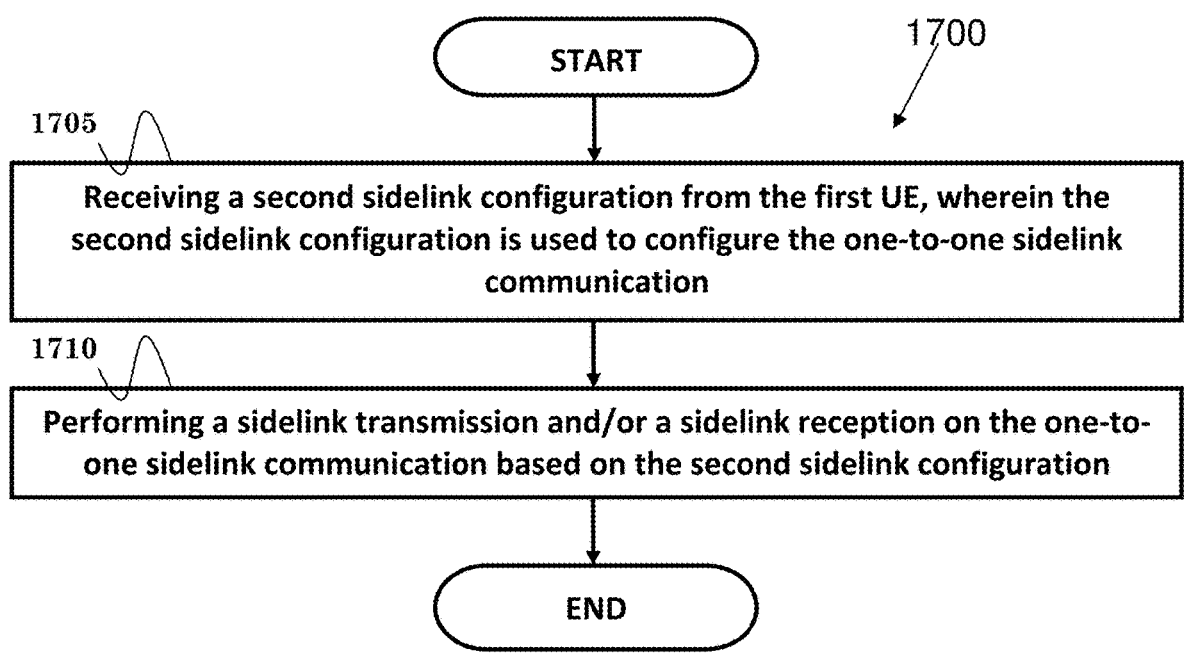
FIG. 17 is a flow chart according to one exemplary embodiment.

FIG. 17 is a flow chart 1700 according to one embodiment from the perspective of a second UE performing a one-to-one sidelink communication with a first UE, wherein the first UE is served by a first network node. In step 1705, the second UE receives a second sidelink configuration from the first UE, wherein the second sidelink configuration is used to configure the one-to-one sidelink communication. In step 1710, the second UE performs a sidelink transmission and/or a sidelink reception on the one-to-one sidelink communication based on the second sidelink configuration.

Referring back to FIGS. 3 and 4, in one exemplary embodiment of a second UE performing a one-to-one sidelink communication with a first UE, wherein the first UE is served by a first network node, the device 300 includes a program code 312 stored in the memory 310. The CPU 308 could execute program code 312 to enable the UE (i) to receive a second sidelink configuration from the first UE, wherein the second sidelink configuration is used to configure the one-to-one sidelink communication, and (ii) to perform a sidelink transmission and/or a sidelink reception on the one-to-one sidelink communication based on the second sidelink configuration. Furthermore, the CPU 308 can execute the program code 312 to perform all of the above-described actions and steps or others described herein.

In the context of the embodiments illustrated of FIGS. 16 and 17 and described above, the second sidelink configuration could be generated based on a first sidelink configuration provided by the first network node to the first UE. Furthermore, the first or second sidelink configuration could include an identity of a sidelink logical channel for the one-to-one sidelink communication, a priority and/or a reliability of a sidelink logical channel for the one-to-one sidelink communication, an identity of a sidelink logical channel group for a sidelink logical channel for the one-to-one sidelink communication, and/or an identity of a QoS flow for a sidelink logical channel for the one-to-one sidelink communication.

In one embodiment, the second sidelink configuration could be transmitted by a PC5-RRC message. Furthermore, the second UE is served by the first base station (e.g. gNB) or by a second base station (e.g. gNB).

In one embodiment, the first UE is an initiating UE, and the second UE is a target UE.

Figure 15C:
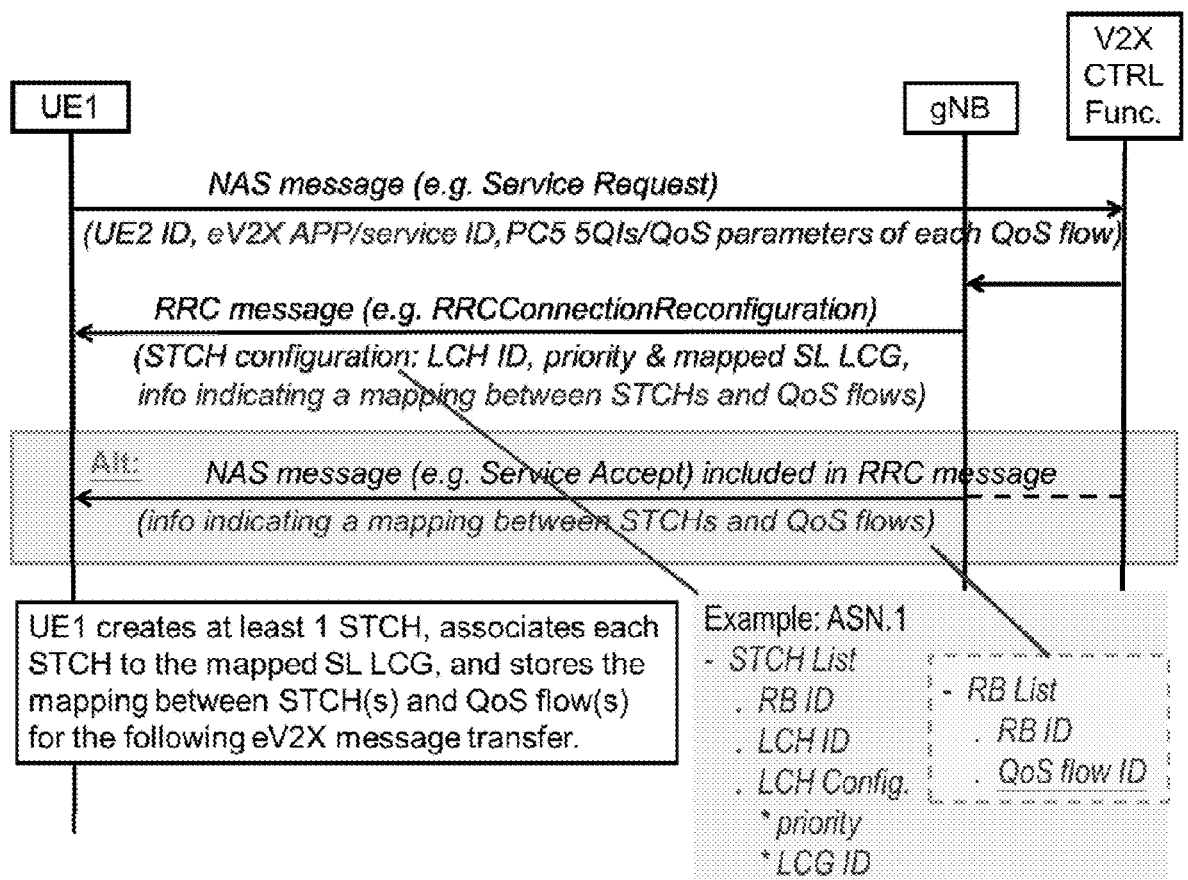

Alternatively, as illustrated in FIG. 15C, the UE-1 could transmit a service request message (e.g. Service Request, a NAS message) to a core network (e.g. V2X Control Function). In the service request message, the content could include at least one of the following:
- An identity of the UE-2;
- An identity of the V2X application;
- An identity of the service provided by the V2X application;
- PC5 5QI of a Qos flow for the V2X application or V2X service; and/or
- PC5 QoS parameters, levels, or profiles of a QoS flow for the V2X application or V2X service.

With the service request message, the core network could verify the PC5 5QI of the Qos flow and/or the PC5 QoS parameters, levels, or profiles of the QoS flow with core network (e.g. V2X Control Function). The core network could indicate the base station to provide UE-1 with a reconfiguration message. In response to reception of the service request message, the core network could transmit a service accept message (e.g. Service Accept, a NAS message) to UE-1. In one embodiment, the service response message could be contained or included in the reconfiguration message. Alternatively, the service response message could be transmitted to UE-1 via a separate RRC message.

A list of sidelink logical channel could be included in the reconfiguration message, and for each sidelink logical channel the reconfiguration message could include at least one of the following:
- An identity of a sidelink radio bearer associated with a sidelink logical channel used for sidelink traffic;
- An identity of the sidelink logical channel;
- A priority of the sidelink logical channel;
- An identity of a sidelink logical channel group (LCG) associated with the sidelink logical channel; and/or
- An identity of a QoS flow mapped to the sidelink logical channel.

In the service accept message, the content could include:
- An identity of the sidelink radio bearer associated with the sidelink logical channel; and/or An identity of a QoS flow mapped to the sidelink radio bearer.

Based on the above reconfiguration message and service accept message, UE-1 could create at least a sidelink logical channel for the one-to-one sidelink communication. Furthermore, UE-1 could associate the sidelink logical channel with a corresponding sidelink LCG. In addition, UE-1 could store a mapping of a QoS flow to the corresponding sidelink logical channel.

Figure 15D:
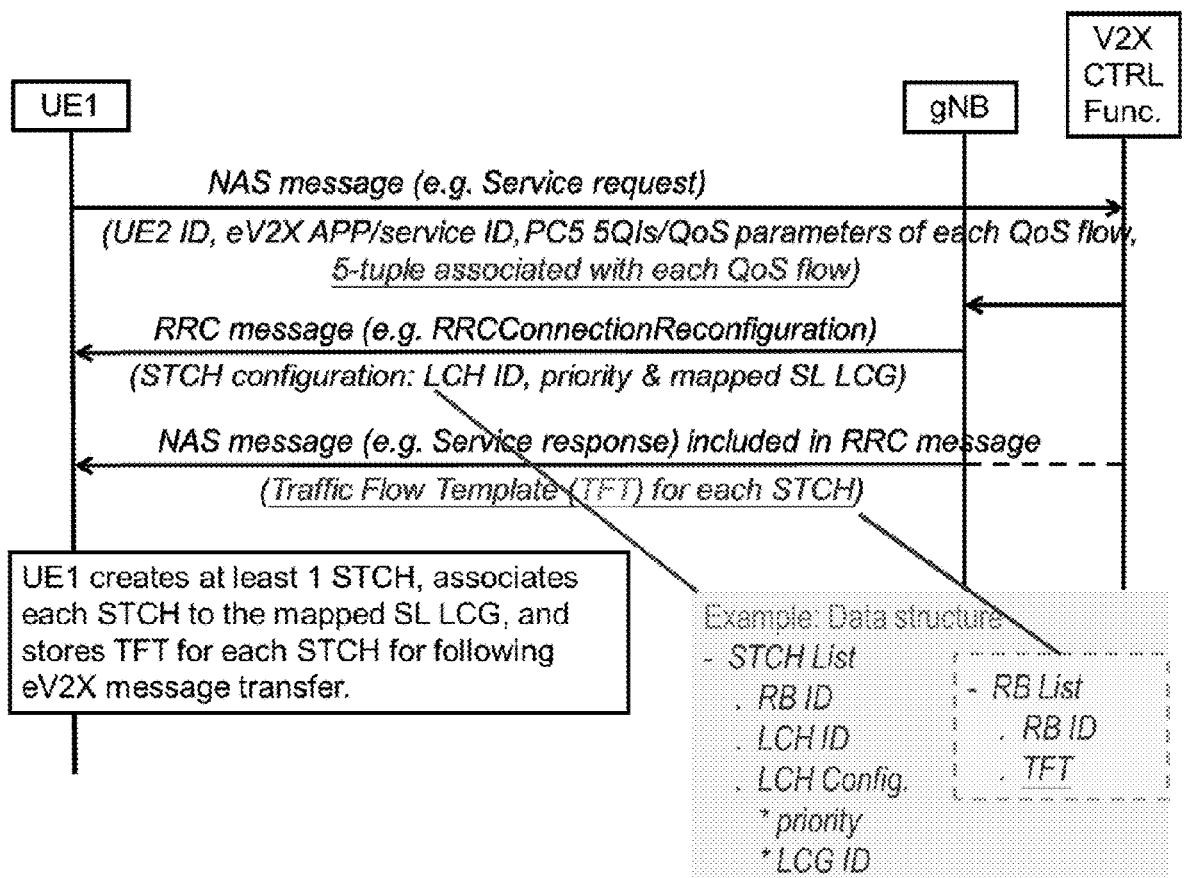

Alternatively, as illustrated in FIG. 15D, UE-1 could transmit a service request message (e.g. Service Request, a NAS message) to a core network (e.g. V2X Control Function). In the service request message, the content could include at least one of the following:

- An identity of the UE-2;
- An identity of the V2X application;
- An identity of the service provided by the V2X application;
- PC5 5QI of a Qos flow for the V2X application or V2X service;
- PC5 QoS parameters/levels/profiles of a QoS flow for the V2X application or V2X service; and/or
- 5-tuple (e.g. source IP addresses, destination IP addresses, source port number, destination port number and protocol ID) of a QoS flow for the V2X application or V2X service.

With the service request message, the core network could verify the PC5 5QI of the Qos flow and/or the PC5 QoS parameters/levels/profiles of the QoS flow with core network (e.g. V2X Control Function). The core network could indicate the base station to provide UE-1 with a reconfiguration message. In response to reception of the service request message, the core network could transmit a service accept message (e.g. Service Accept, a NAS message) to UE-1. In one embodiment, the service response message could be contained or included in the reconfiguration message. Alternatively, the service response message could be transmitted to UE-1 via a separate RRC message.

A list of sidelink logical channel could be included in the reconfiguration message, and for each sidelink logical channel, the reconfiguration message could include at least one of the following:

- An identity of a sidelink radio bearer associated with a sidelink logical channel used for sidelink traffic;
- An identity of the sidelink logical channel;
- A priority of the sidelink logical channel; and/or
- An identity of a sidelink logical channel group (LCG) associated with the sidelink logical channel.

In the service accept message, the content could include:

- An identity of the sidelink radio bearer associated with the sidelink logical channel; and/or
- A Traffic Flow Template (TFT) associated with the sidelink radio bearer.

Based on the above reconfiguration message and service accept message, UE-1 could create at least a sidelink logical channel for the one-to-one sidelink communication. Furthermore, UE-1 could associate the sidelink logical channel with a corresponding sidelink LCG. In addition, UE-1 could store the TFT associated with the sidelink logical channel.

Figure 18:
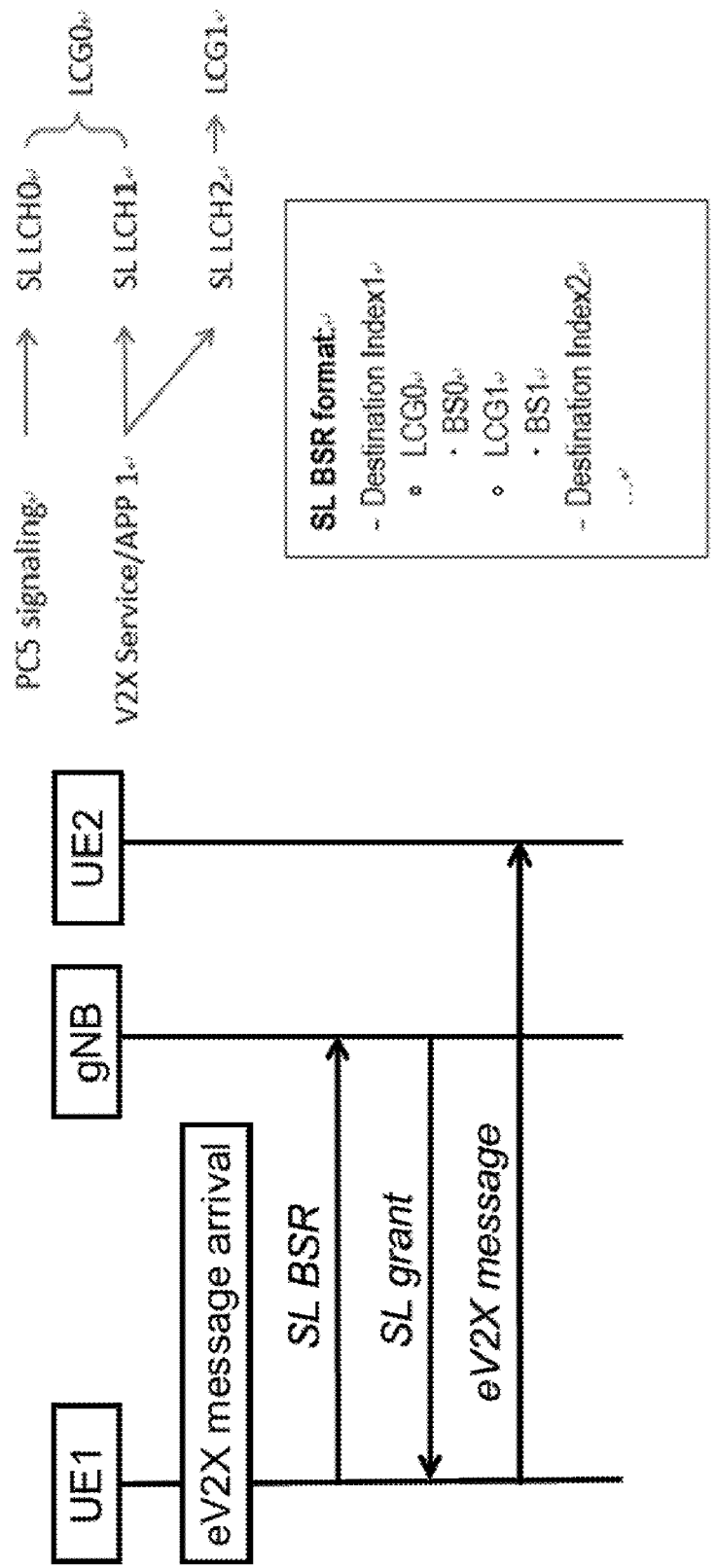
FIG. 18 is a diagram according to one exemplary embodiment.

V. eV2X Message Transfer (Illustrated in FIG. 18)

In UE-1, sidelink traffic from the V2X application could be available for transmission to UE-2. In this situation, UE-1 could transmit a sidelink buffer status report to the base station for allocating sidelink resource for the transmission of the sidelink traffic. A format of LTE SL BSR (as discussed in 3GPP TS 36.321) could be reused for the sidelink buffer status report.

During the one-to-one SL communication with UE-2, UE-1 may move from the coverage of a source gNB to the coverage of a target gNB. In this situation, the source gNB has to handover UE-1 to the target gNB. To make sure the target gNB can continue to provide the required sidelink resources to support the one-to-one SL communication, the source gNB needs to transfer certain sidelink information related to the one-to-one SL communication to the target gNB.

For example, the source gNB may transfer at least one of the following:

- An identity of the UE-2, which may be included in a destination list;
- An identity of the V2X application;
- An identity of the service provided by the V2X application;
- PC5 5QI of a QoS flow for the V2X application or V2X service, wherein there is at least one QoS flow; and/or
- PC5 QoS parameters, levels, or profiles of a QoS flow for the V2X application or V2X service, wherein there is at least one QoS flow.

With the sidelink information from the source gNB, the target gNB could determine at least one sidelink configuration for the one-to-one sidelink communication and provide the sidelink configuration(s) to the source gNB for being included in a handover command (e.g. RRCConnectionReconfiguration message) sent to UE-1. The sidelink configuration could include at least one of the following:

- An identity of the UE-2, which may be included in a destination list;
- An identity of a sidelink logical channel used for sidelink traffic transmission, wherein there is at least one sidelink logical channel;
- A priority of the sidelink logical channel;
- An identity of a sidelink logical channel group (LCG) associated with the sidelink logical channel; and/or
- An identity of a QoS flow mapped to the sidelink logical channel, wherein there is at least one QoS flow mapped to one the sidelink logical channel.

Alternatively, the source gNB may just send a sidelink configuration stored in the source gNB for UE-1 to the target gNB for use after the handover procedure is completed. For example, the source gNB may send a message to the target gNB, wherein the message includes sidelink configuration associated with a one-to-one SL communication between UE-1 and UE-2, and the sidelink configuration could contain at least one of the following:

- An identity of the UE-2, which may be included in a destination list;
- An identity of a sidelink logical channel used for sidelink traffic transmission, wherein there is at least one sidelink logical channel;
- A priority of the sidelink logical channel;
- An identity of a sidelink logical channel group (LCG) associated with the sidelink logical channel; and/or
- An identity of a QoS flow mapped to the sidelink logical channel, wherein there is at least one QoS flow mapped to one the sidelink logical channel.

Figure 19:
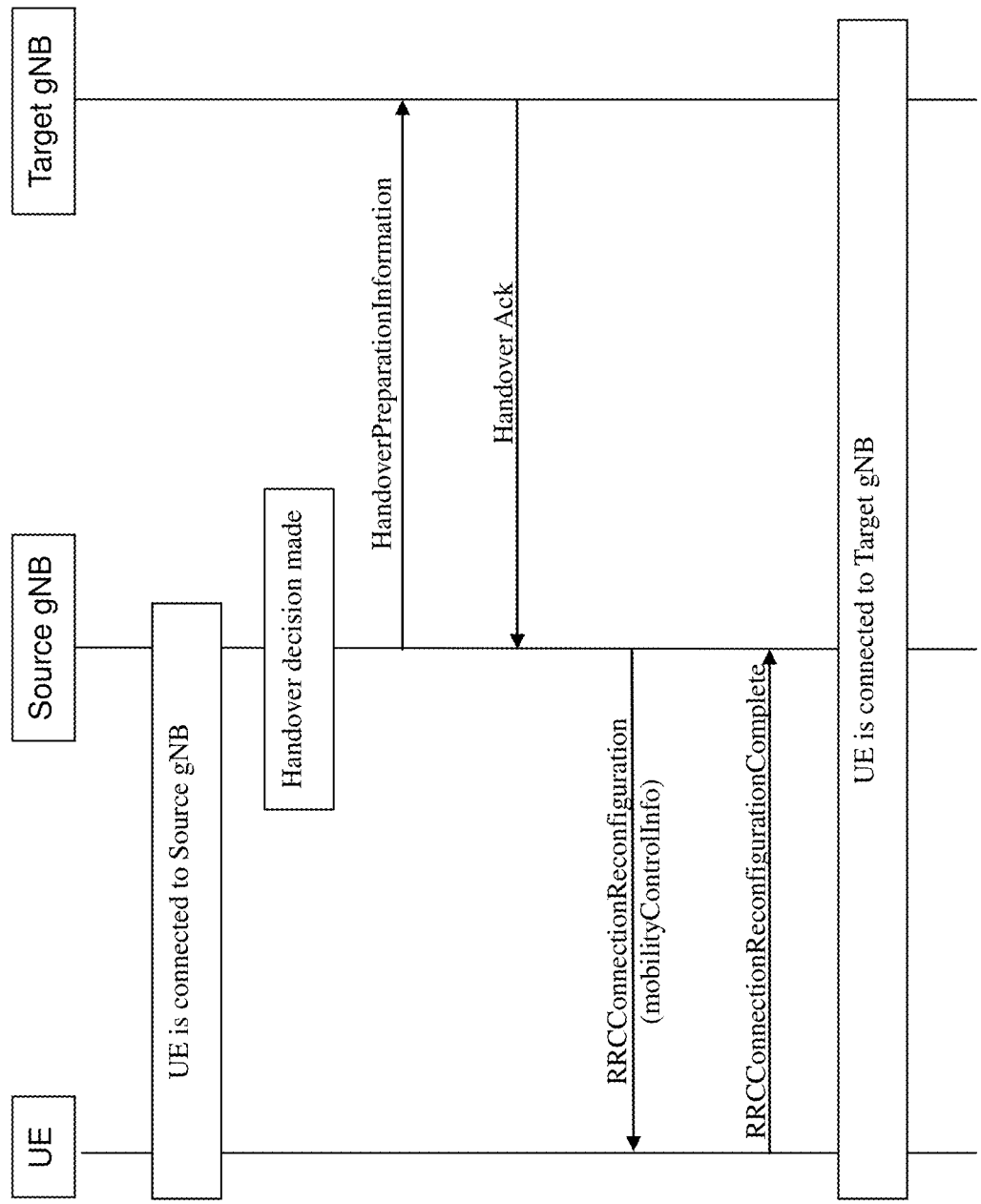
FIG. 19 is a diagram according to one exemplary embodiment.

The message could be a HandoverPreparationInformation sent from the source gNB to the target gNB. The sidelink information could be used by the target gNB after the UE-1 is handovered from the source gNB to the target gNB. The target gNB may modify the sidelink logical channel configuration if necessary, and provide the modified sidelink logical channel configuration to UE-1 in the handover command sent to UE-1. An example of inter-gNB handover is illustrated in FIG. 19, where the RRCConnectionReconfiguration message with information element "mobilityControlInfo" corresponds to a Handover Command.

Figure 20:
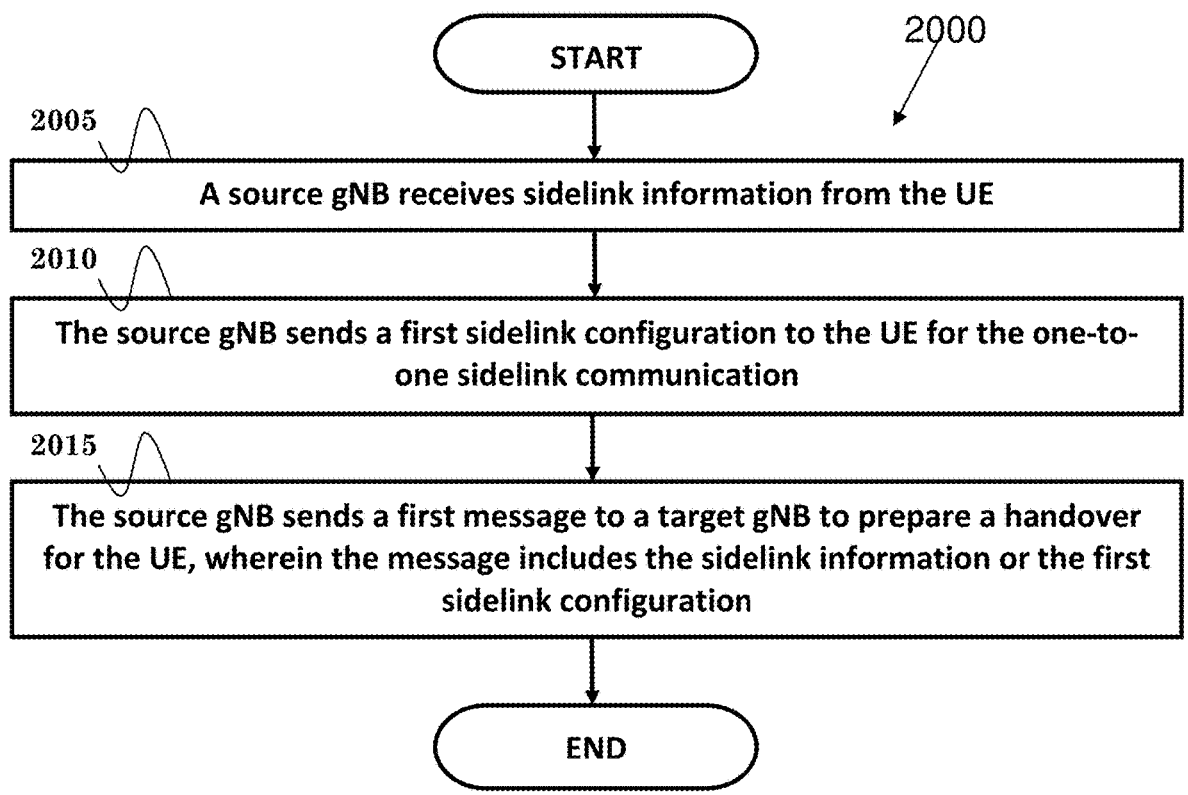
FIG. 20 is a flow chart according to one exemplary embodiment.

FIG. 20 is a flow chart 2000 according to one exemplary embodiment from the perspective of a source gNB for handling mobility of a UE with a one-to-one sidelink communication. In step 2005, a source gNB receives sidelink information from the UE. In step 2010, the source gNB sends a first sidelink configuration to the UE for the one-to-one sidelink communication. In step 2015, the source gNB sends a first message to a target gNB to prepare a handover for the UE, wherein the message includes the sidelink information or the first sidelink configuration.

In one embodiment, the sidelink information could include at least one of the following: an identity of a second UE, an identity of a V2X application, a service identity for the V2X application, PC5 5QI of a QoS flow for the V2X application or a V2X service, and PC5 QoS parameters, levels, or profiles of a QoS flow for the V2X application or the V2X service.

Furthermore, the first sidelink configuration could include at least one of the following: an identity of a second UE, an identity of a sidelink logical channel used for sidelink traffic transmission, a priority of the sidelink logical channel, an identity of a sidelink logical channel group (LCG) associated with the sidelink logical channel, and an identity of a QoS flow mapped to the sidelink logical channel.

In one embodiment, the first message could be a HandoverPreparationInformation. Furthermore, the source gNB could receive a handover command from the target gNB. The handover command could include a second sidelink configuration and the second sidelink configuration is the same as the first sidelink configuration. The handover command could also include a second sidelink configuration and the second sidelink configuration is different from the first sidelink configuration.

In one embodiment, the source gNB sends a second message to the UE for handover the UE to the target gNB. The second message could be a RRCConnectionReconfiguration. The RRCConnectionReconfiguration could be generated according to the handover command. The RRCConnectionReconfiguration could include an information element "mobilityControlInfo".

Referring back to FIGS. 3 and 4, in one exemplary embodiment a source gNB for handling mobility of a UE with a one-to-one sidelink communication, the device 300 includes a program code 312 stored in the memory 310. The CPU 308 could execute program code 312 to enable the source gNB (i) to receive sidelink information from the UE, (ii) to send a first sidelink configuration to the UE for the one-to-one sidelink communication, and (iii) to send a first message to a target gNB to prepare a handover for the UE, wherein the message includes the sidelink information or the first sidelink configuration. Furthermore, the CPU 308 can execute the program code 312 to perform all of the above-described actions and steps or others described herein.

Figure 21:
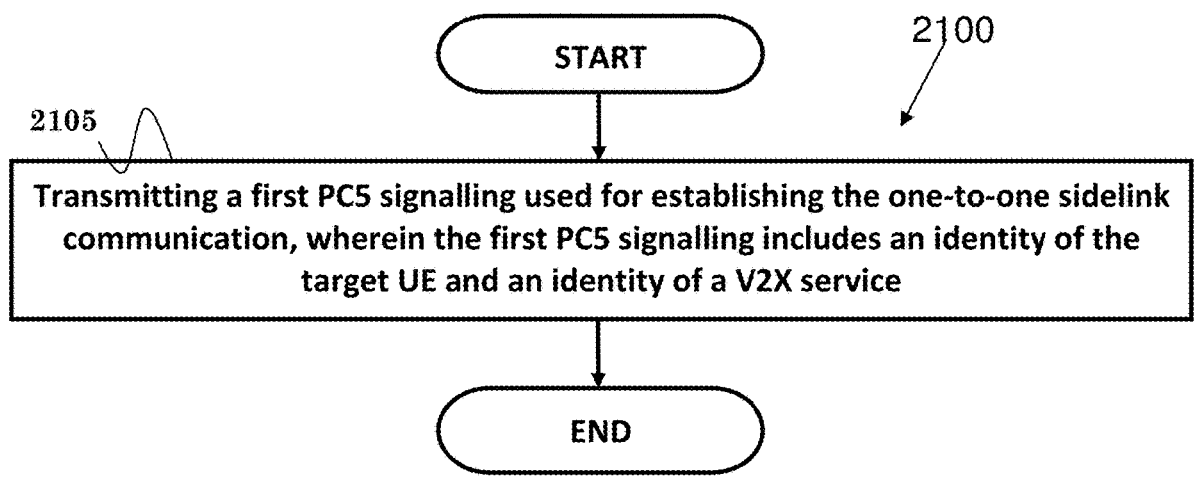
FIG. 21 is a flow chart according to one exemplary embodiment.

FIG. 21 is a flow chart 2100 according to one exemplary embodiment from the perspective of an initiating UE (User Equipment) establishing a one-to-one sidelink communication with a target UE. In step 2105, the initiating UE transmits a first PC5 signalling used for establishing the one-to-one sidelink communication, wherein the first PC5 signalling includes an identity of the target UE and an identity of a V2X (Vehicle-to-Everything) service.

In one embodiment, the initiating UE could be aware of the presence of the target UE via a discovery procedure or a one-to-many sidelink communication. Furthermore, the initiating UE could be aware of the presence of the target UE via reception of one or more V2X messages from the target UE. The first PC5 signalling could include an identity of a V2X application offering the V2X service, an identity of the initiating UE, and/or requested PC5 5QI, QoS (Quality of Service) parameter(s) or QoS profile(s) of a PC5 QoS flow for the V2X application or the V2X service.

In one embodiment, the first PC5 signalling could be transmitted to a broadcast address associated with the V2X service or the V2X application. The first PC5 signalling could be a Direct Communication Request message.

In one embodiment, the initiating UE could receive a second PC5 signalling from the target UE, wherein the second PC5 signalling is used to complete establishment of the one-to-one sidelink communication. The second PC5 signalling could include accepted PC5 5QI, QoS parameter(s) or QoS profile(s) of a PC5 QoS flow for the V2X application or the V2X service. The second PC5 signalling could be a Direct Communication Accept message.

Referring back to FIGS. 3 and 4, in one exemplary embodiment of an initiating UE establishing a one-to-one sidelink communication with a target UE, the device 300 includes a program code 312 stored in the memory 310. The CPU 308 could execute program code 312 to enable the initiating UE to transmit a first PC5 signalling used for establishing the one-to-one sidelink communication, wherein the first PC5 signalling includes an identity of the target UE and an identity of a V2X (Vehicle-to-Everything) service. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for an initiating UE (User Equipment) to establish a unicast link with a target UE, comprising:
   transmitting a first PC5 signalling, to a broadcast address associated with a V2X (Vehicle-to-Everything) service or a V2X application offering the V2X service, using a source layer 2 identity that is set to a layer 2 identity of the initiating UE, wherein the first PC5 signalling is used for establishing the unicast link with the target UE and wherein the first PC5 signalling includes an application layer identity of the target UE and an identity of the V2X service; and
   receiving a second PC5 signalling from the target UE, wherein the second PC5 signalling is used to complete establishment of the unicast link with the target UE; and
   transmitting one or more V2X messages to the target UE via the unicast link established in association with the first PC5 signalling and the second PC5 signalling.

2. The method of claim 1, wherein the initiating UE is aware of the presence of the target UE via a discovery procedure or a one-to-many sidelink communication.

3. The method of claim 1, wherein the first PC5 signalling includes an identity of the V2X application offering the V2X service.

4. The method of claim 1, wherein the first PC5 signalling includes an application layer identity of the initiating UE.

5. The method of claim 1, wherein the first PC5 signalling includes requested PC5 5QI, QoS (Quality of Service) parameter(s) or QoS profile(s) of a PC5 QoS flow for the V2X application offering the V2X service or the V2X service.

6. The method of claim 1, wherein the second PC5 signalling includes accepted PC5 5QI for the V2X application offering the V2X service or the V2X service.

7. The method of claim 1, wherein the first PC5 signalling is a Direct Communication Request message.

8. The method of claim 1, wherein the second PC5 signalling includes QoS (Quality of Service) parameter(s) for the V2X application offering the V2X service or the V2X service.

9. The method of claim 1, wherein the second PC5 signalling includes QoS (Quality of Service) profile(s) of a PC5 QoS flow for the V2X application offering the V2X service or the V2X service.

10. The method of claim 1, wherein the second PC5 signalling is a Direct Communication Accept message.

11. An initiating communication device, comprising:
    a control circuit;
    a processor installed in the control circuit; and
    a memory installed in the control circuit and operatively coupled to the processor;
    wherein the processor is configured to execute a program code stored in the memory to:
       transmit a first PC5 signalling, to a broadcast address associated with a V2X (Vehicle-to-Everything) service or a V2X application offering the V2X service, using a source layer 2 identity that is set to a layer 2 identity of the initiating communication device, wherein the first PC5 signalling is used for establishing a unicast link with a target communication device and wherein the first PC5 signalling includes an application layer identity of the target communication device and an identity of the V2X service;

receive a second PC5 signalling from the target communication device, wherein the second PC5 signalling is used to complete establishment of the unicast link with the target communication device; and transmit one or more V2X messages to the target communication device via the unicast link established in association with the first PC5 signalling and the second PC5 signalling.

12. The initiating communication device of claim 11, wherein the initiating communication device is aware of the presence of the target communication device via a discovery procedure or a one-to-many sidelink communication.

13. The initiating communication device of claim 11, wherein the first PC5 signalling includes an identity of the V2X application offering the V2X service.

14. The initiating communication device of claim 11, wherein the first PC5 signalling includes an application layer identity of the initiating communication device.

15. The initiating communication device of claim 11, wherein the first PC5 signalling includes requested PC5 5QI, QoS (Quality of Service) parameter(s) or QoS profile(s) of a PC5 QoS flow for the V2X application offering the V2X service or the V2X service.

16. The initiating communication device of claim 11, wherein the second PC5 signalling includes accepted PC5 5QI for the V2X application offering the V2X service or the V2X service.

17. The initiating communication device of claim 11, wherein the first PC5 signalling is a Direct Communication Request message.

18. The initiating communication device of claim 11, wherein the second PC5 signalling includes QoS (Quality of Service) parameter(s) for the V2X application offering the V2X service or the V2X service.

19. The initiating communication device of claim 11, wherein the second PC5 signalling includes QoS (Quality of Service) profile(s) of a PC5 QoS flow for the V2X application offering the V2X service or the V2X service.

20. The initiating communication device of claim 11, wherein the second PC5 signalling is a Direct Communication Accept message.

* * * * *